(12) United States Patent
Nudel et al.

(10) Patent No.: US 11,734,539 B2
(45) Date of Patent: Aug. 22, 2023

(54) DYNAMIC OPTICAL PROPERTY WINDOWS IN INDICIA WITH SENSORS

(71) Applicant: Temptime Corporation, Morris Plains, NJ (US)

(72) Inventors: Eric A. Nudel, Chicago, IL (US); Mohannad Abdo, Clifton, NJ (US); Nicholas A. Maas, Morristown, NJ (US); Thaddeus Prusik, Stroudsburg, PA (US)

(73) Assignee: TEMPTIME CORPORATION, Morris Plains, NJ (US)

( * ) Notice: Subject to any disclaimer, the term of this patent is extended or adjusted under 35 U.S.C. 154(b) by 0 days.

(21) Appl. No.: 17/222,087

(22) Filed: Apr. 5, 2021

(65) Prior Publication Data

US 2022/0318583 A1    Oct. 6, 2022

(51) Int. Cl.
*G06K 19/07* (2006.01)
*G06K 19/06* (2006.01)

(52) U.S. Cl.
CPC ... *G06K 19/0717* (2013.01); *G06K 19/06028* (2013.01); *G06K 19/0723* (2013.01)

(58) Field of Classification Search
CPC ......... G06K 19/0717; G06K 19/06028; G06K 19/0723
USPC ...................................................... 235/492
See application file for complete search history.

(56) References Cited

U.S. PATENT DOCUMENTS

| | | | |
|---|---|---|---|
| 3,999,946 A | 12/1976 | Patel et al. |
| 4,189,399 A | 2/1980 | Patel |
| 4,384,980 A | 5/1983 | Patel |
| 4,646,066 A | 2/1987 | Baughman et al. |
| 4,729,671 A | 3/1988 | Asano et al. |
| 4,778,729 A | 10/1988 | Mizobuchi |
| 4,788,151 A | 11/1988 | Preziosi et al. |
| 4,789,637 A | 12/1988 | Preziosi |
| 4,935,206 A | 6/1990 | Heim |
| 5,045,283 A | 9/1991 | Patel |
| 5,053,339 A | 10/1991 | Patel |
| 5,057,434 A | 10/1991 | Prusik et al. |

(Continued)

FOREIGN PATENT DOCUMENTS

| | | |
|---|---|---|
| CN | 101769884 | 7/2010 |
| CN | 103295043 | 9/2013 |

(Continued)

OTHER PUBLICATIONS

International Search Report and Written Opinion dated Aug. 3, 2022 issued for International PCT Application No. PCT/US22/21261.

(Continued)

*Primary Examiner* — Michael G Lee
*Assistant Examiner* — David Tardif
(74) *Attorney, Agent, or Firm* — K&L Gates LLP

(57) ABSTRACT

An environmental exposure indicator includes a substrate and an environmental exposure indicator ("EEI") material provided on the substrate that is configured to change an optical property between a creation state and an end state. The environmental exposure indicator material has a deployment state, between the creation state and the end state, at a deployment time. The environmental exposure indicator also includes calibration data based on the deployment state.

20 Claims, 13 Drawing Sheets

(56) References Cited

U.S. PATENT DOCUMENTS

| | | | |
|---|---|---|---|
| 5,109,864 A | 5/1992 | Lu | |
| 5,254,473 A | 10/1993 | Patel | |
| 5,667,303 A | 9/1997 | Arens et al. | |
| 5,709,472 A | 1/1998 | Prusik et al. | |
| 5,827,617 A | 10/1998 | Krauter | |
| 6,042,264 A | 3/2000 | Prusik et al. | |
| 6,043,021 A * | 3/2000 | Manico | G03C 3/00 430/617 |
| 6,070,805 A | 6/2000 | Kaufman et al. | |
| 6,517,239 B1 | 2/2003 | Roth | |
| 6,614,728 B2 | 9/2003 | Spevacek | |
| 6,642,016 B1 | 11/2003 | Sjoholm et al. | |
| 6,685,094 B2 | 2/2004 | Cameron | |
| 6,741,523 B1 | 5/2004 | Bommarito et al. | |
| 6,832,729 B1 | 12/2004 | Perry et al. | |
| 7,139,226 B2 * | 11/2006 | Haas | G04F 1/06 368/327 |
| 7,209,042 B2 | 4/2007 | Martin et al. | |
| 7,490,575 B2 | 2/2009 | Taylor et al. | |
| 7,517,146 B2 | 4/2009 | Smith et al. | |
| 7,604,398 B1 | 10/2009 | Akers et al. | |
| 7,691,634 B2 | 4/2010 | Vaillant | |
| 7,719,404 B2 | 5/2010 | Makela et al. | |
| 7,878,410 B2 | 2/2011 | Norrby et al. | |
| 8,267,576 B2 | 9/2012 | Haarer et al. | |
| 8,395,521 B2 | 3/2013 | Kauffman et al. | |
| 8,579,193 B2 | 11/2013 | Nemet et al. | |
| 8,629,081 B2 | 1/2014 | Azizian | |
| 8,671,871 B2 | 3/2014 | Huffman et al. | |
| 8,757,503 B2 | 6/2014 | Conzelmann | |
| 8,870,082 B2 | 10/2014 | Cattaneo et al. | |
| 8,899,829 B1 | 12/2014 | Butera et al. | |
| 8,957,780 B2 | 2/2015 | Cooperman | |
| 8,968,662 B2 | 3/2015 | Haarer et al. | |
| 9,011,794 B2 | 4/2015 | Haarer et al. | |
| 9,546,911 B2 | 1/2017 | Huffman et al. | |
| 9,563,798 B1 | 2/2017 | Laser et al. | |
| 9,606,140 B2 | 3/2017 | Burghardt et al. | |
| 10,318,781 B2 | 6/2019 | Prusik et al. | |
| 10,546,172 B2 | 1/2020 | Prusik et al. | |
| 11,120,241 B2 | 9/2021 | Abdo et al. | |
| 11,151,434 B2 | 10/2021 | Abdo et al. | |
| 11,182,579 B2 | 11/2021 | Prusik et al. | |
| 2003/0042317 A1 | 3/2003 | Behm et al. | |
| 2003/0098357 A1 | 5/2003 | Cummings et al. | |
| 2004/0092023 A1 | 5/2004 | Wright | |
| 2004/0212509 A1 | 10/2004 | Zweig | |
| 2005/0162274 A1 | 7/2005 | Shniberg et al. | |
| 2006/0083657 A1 | 4/2006 | McDonnell et al. | |
| 2006/0145863 A1 | 7/2006 | Martin et al. | |
| 2006/0227669 A1 | 10/2006 | Pennaz et al. | |
| 2007/0029388 A1 | 2/2007 | Liu | |
| 2007/0058493 A1 | 3/2007 | Kuczynski et al. | |
| 2007/0076779 A1 | 4/2007 | Haarer | |
| 2007/0275467 A1 | 11/2007 | Louvet | |
| 2008/0063575 A1 | 3/2008 | Rakow et al. | |
| 2008/0173712 A1 | 7/2008 | Nemet et al. | |
| 2008/0232427 A1 | 9/2008 | Leute et al. | |
| 2009/0010304 A1 | 1/2009 | Skinner et al. | |
| 2009/0020609 A1 | 1/2009 | Cohen et al. | |
| 2009/0166438 A1 | 7/2009 | Sanchez et al. | |
| 2010/0012018 A1 | 1/2010 | Ribi | |
| 2011/0006109 A1 | 1/2011 | Nemet et al. | |
| 2011/0084128 A1 | 4/2011 | Haarer et al. | |
| 2011/0258130 A1 | 10/2011 | Grabiner et al. | |
| 2011/0312096 A1 | 12/2011 | Whilman et al. | |
| 2012/0079981 A1 | 4/2012 | Huffman et al. | |
| 2012/0172825 A1 | 7/2012 | Ales et al. | |
| 2012/0175412 A1 | 7/2012 | Grabiner et al. | |
| 2012/0286028 A1 | 11/2012 | Simske et al. | |
| 2012/0326878 A1 | 12/2012 | Viguie et al. | |
| 2013/0002265 A1 * | 1/2013 | Martin | G09F 3/0291 324/705 |
| 2013/0015236 A1 | 1/2013 | Porter | |
| 2013/0027495 A1 | 1/2013 | Savagian | |
| 2013/0215004 A1 | 8/2013 | Nordlinder | |
| 2013/0224875 A1 | 8/2013 | Haarer et al. | |
| 2014/0009605 A1 | 1/2014 | Lane | |
| 2014/0023264 A1 | 1/2014 | Branch et al. | |
| 2014/0127738 A1 | 5/2014 | Lee et al. | |
| 2014/0154808 A1 | 6/2014 | Patel | |
| 2014/0252096 A1 | 9/2014 | Nemet | |
| 2014/0334723 A1 | 11/2014 | Chatow et al. | |
| 2014/0339312 A1 | 11/2014 | Simske | |
| 2015/0116093 A1 | 4/2015 | Swager et al. | |
| 2015/0118362 A1 | 4/2015 | Raczynski | |
| 2015/0193677 A1 | 7/2015 | Nemet | |
| 2015/0199545 A1 | 7/2015 | Sakina et al. | |
| 2015/0317896 A1 * | 11/2015 | Planton | G08B 21/182 340/584 |
| 2015/0332135 A1 | 11/2015 | Dixit | |
| 2016/0154939 A1 | 6/2016 | Grabiner et al. | |
| 2016/0292486 A1 | 10/2016 | Prusik et al. | |
| 2017/0193260 A1 | 7/2017 | Prusik et al. | |
| 2017/0322090 A1 * | 11/2017 | Jones | G01K 1/022 |
| 2019/0197377 A1 | 6/2019 | Studnicka et al. | |
| 2019/0210806 A1 | 7/2019 | Aida et al. | |
| 2019/0267045 A1 | 8/2019 | Rueger et al. | |
| 2019/0316975 A1 | 10/2019 | Tada et al. | |
| 2019/0383649 A1 | 12/2019 | Abdo | |
| 2020/0005237 A1 | 1/2020 | Simons | |
| 2020/0158579 A1 | 5/2020 | Tokuda et al. | |
| 2020/0234019 A1 | 7/2020 | Prusik et al. | |
| 2021/0034831 A1 | 2/2021 | Abdo et al. | |
| 2021/0034933 A1 | 2/2021 | Abdo et al. | |
| 2022/0067468 A1 | 3/2022 | Smith et al. | |

FOREIGN PATENT DOCUMENTS

| | | |
|---|---|---|
| CN | 103543146 | 1/2014 |
| CN | 104250715 | 12/2014 |
| CN | 204155296 | 2/2015 |
| CN | 108256607 | 7/2018 |
| CN | 108682283 | 10/2018 |
| DE | 19912529 | 9/2000 |
| DE | 10325714 | 10/2004 |
| DE | 202005006301 | 6/2005 |
| DE | 102006004974 | 8/2007 |
| DE | 102013011238 | 1/2015 |
| EP | 1048476 | 11/2000 |
| EP | 1319928 | 6/2003 |
| EP | 1645856 | 4/2006 |
| FI | 200300299 | 2/2003 |
| GB | 2430257 | 3/2007 |
| IN | 1280/CHENP/2004 | 5/2006 |
| JP | 2002099879 | 4/2002 |
| JP | 2008233909 | 3/2007 |
| JP | 2007285838 | 11/2007 |
| JP | 2013122341 | 6/2013 |
| JP | 5723474 | 5/2015 |
| KR | 101519317 | 5/2015 |
| WO | WO 200550192 | 4/2006 |
| WO | WO 200756752 | 5/2007 |
| WO | WO 200806154 | 1/2008 |
| WO | WO 200961831 | 5/2009 |
| WO | WO 201061134 | 6/2010 |
| WO | WO 201078422 | 7/2010 |
| WO | WO 201085755 | 7/2010 |
| WO | WO 201302552 | 1/2013 |
| WO | WO 201390407 | 6/2013 |
| WO | WO 2014027424 | 2/2014 |
| WO | WO 2014102556 | 7/2014 |
| WO | WO 2014153476 | 9/2014 |
| WO | WO 2015113086 | 8/2015 |
| WO | WO 2016160912 | 10/2016 |
| WO | WO 2018000051 | 1/2018 |
| WO | WO 2019206130 | 10/2019 |
| WO | WO 2019241431 | 12/2019 |

OTHER PUBLICATIONS

Windl, et al., "Reactivable passive radio-frequency identification temperature indicator" J. Appl. Phys. 117, 17C125 (2015).

(56) References Cited

OTHER PUBLICATIONS

Extended European Search Report dated Dec. 8, 2020 Issued for European Patent Application No. 18772467.9.
Examination Report dated Jul. 27, 2020 Issued for Australian Patent Application No. 2018239238.
Patent Office Action dated Jan. 23, 2012 issued for Korean Patent Application No. 10-2019-7031049 and English summary.
International Search Report and Written Opinion dated Aug. 5, 2016 issued for International PCT Application No. PCT/US16/24884 filed: Mar. 30, 2016.
International Search Report and Written Opinion dated Jul. 26, 2018 issued for International PCT Application No. PCT/US18/23068.
International Search Report and Written Opinion dated Dec. 16, 2020 issued for International PCT Application No. PCT/US20/44081.
International Search Report and Written Opinion dated Dec. 18, 2020 issued for International PCT Application No. PCT/US20/44055.
International Search Report and Written Opinion dated Oct. 10, 2019 issued for international PCT Application No. PCT/US2019/036837.
R. E. Blahut, "Theory and Practice of Error Control Codes (corr. Edition)", 1983, p. 166.
S.A. Vanstone et al., "An Introduction to Error Correcting Codes with Applications", 1989, p. 219.
FreshCode TTI Labels—Varcode.
GSI General Specifications, V15, Issue 2, Jan. 2015, http://www.gs1.org/docs/barcodes/GS1_General_Specifications.pdf.
Tanguy, et al., "Enhanced Radio Frequency Biosensor for Food Quality Detection Using Functionalized Carbon . . . ", ACS Appl. Mater. Interfaces, 2015, 7 (22), pp. 11939-11947.
Wu, et al., "3D-printed microelectronics for integrated circuitry and passive wireless sensors", Microsystems & Nanoengineering 1, Article No. 15013 (2015).
Yang, "3D-printed 'smart cap' uses electronics to sense spoiled food", Jul. 20, 2015, UC Berkeley, http://news.berkeley.edu/2015/07/20/3d-printed-electronic-smart-cap/.
Wan, A new type of TTI based on an electrochemical pseudo transistor, Journal of Food Engineering, vol. 168, Jan. 2016, pp. 79-83.
News: New 3D technique . . . Aug. 15, 2015,AIPIA Active & Intelligent Packaging Industry Assoc., http://www.atpla.info/news-New-3D-technique-Pfinte-Embedded-Smart-Cap-Sensor-444.php.
http://www.businesswire.com/news/home/20151013005396/en/3615067/Palladio-Group-Ink-Introduce-PhutureMed%E2%84%A2-Advanced-Packaging.

* cited by examiner

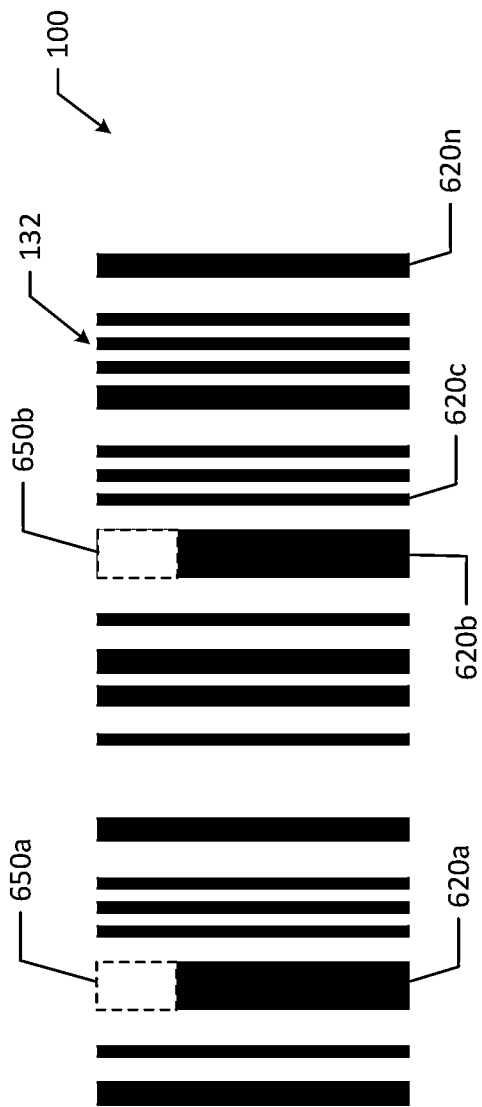
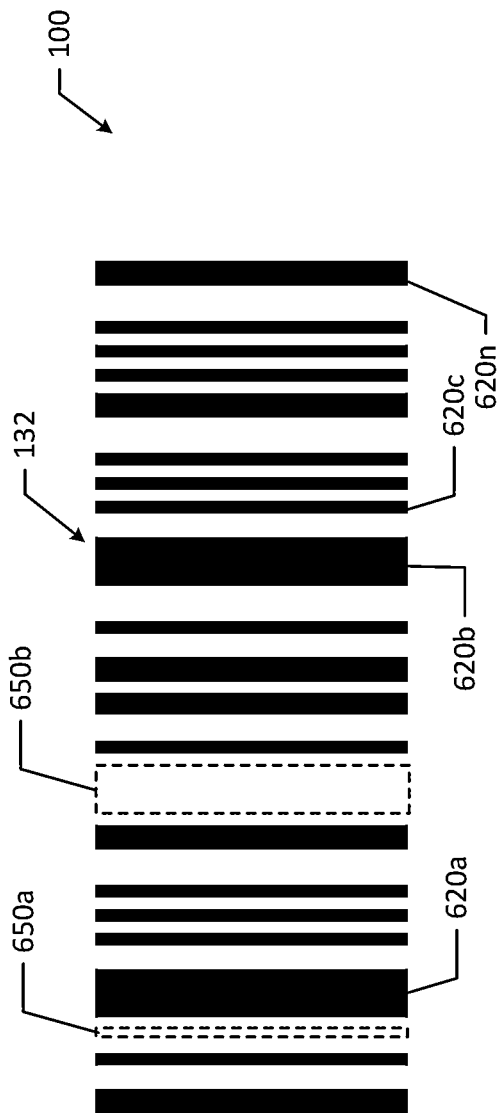
FIG. 6A
FIG. 6B

DYNAMIC OPTICAL PROPERTY WINDOWS IN INDICIA WITH SENSORS

BACKGROUND

Environmental indicators may include environmental exposure indicator materials and indicia, such as machine-readable symbols or barcodes. The indicia may be provided in static form as a printed indicia, etched indicia (e.g., laser etched), etc. Additionally, the indicia may be provided along with the environmental exposure indicator materials onto documents or media such as tags, labels, packaging, cards, or wristbands using substances such as ink, dye, paint, toner, or wax to track the environmental exposure history of products associated with such tags, etc.

SUMMARY

The present disclosure provides a new and innovative indicia with sensors (e.g., environmental exposure indicator materials) and apparatus, systems, methods and techniques for dynamically calibrating optical property windows in indicia with sensors. Aspects of the subject matter described herein may be useful alone or in combination with one or more other aspects described herein. In an aspect of the present disclosure, an environmental exposure indicator includes a substrate and an environmental exposure indicator ("EEI") material provided on the substrate that is configured to change an optical property between a creation state and an end state. The environmental exposure indicator material has a deployment state, between the creation state and the end state, at a deployment time. The environmental exposure indicator also includes calibration data based on the deployment state.

In another aspect of the present disclosure, which may be used in combination with any other aspect or combination of aspects listed herein, the calibration data is encoded in an indicia provided on the substrate.

In another aspect of the present disclosure, which may be used in combination with any other aspect or combination of aspects listed herein, the indicia is a barcode.

In another aspect of the present disclosure, which may be used in combination with any other aspect or combination of aspects listed herein, the calibration data is encoded in an RFID tag coupled to the substrate.

In another aspect of the present disclosure, which may be used in combination with any other aspect or combination of aspects listed herein, the optical property of the EEI material changes responsive to a cumulative exposure to a first environmental condition before the deployment time and the optical property of the EEI material changes responsive to a second cumulative exposure to a second environmental condition after the deployment time.

In another aspect of the present disclosure, which may be used in combination with any other aspect or combination of aspects listed herein, the first environmental condition is temperature and the second environmental condition is temperature.

In another aspect of the present disclosure, which may be used in combination with any other aspect or combination of aspects listed herein, the optical property is reflectivity of light in the visible spectrum.

In another aspect of the present disclosure, which may be used in combination with any other aspect or combination of aspects listed herein, the indicator is configured for attachment to an item and the indicia further comprises data associated with the item.

Aspects of the subject matter described herein may be useful alone or in combination with one or more other aspects described herein. In an aspect of the present disclosure, a media processing device includes a processor and an image capture assembly. The image capture assembly is configured to capture an image of a media comprising an environmental exposure indicator ("EEI") material, analyze the captured image to detect a current optical property of the environmental exposure indicator material, determine calibration data based on the detected optical property, and encode the calibration data to the media.

In another aspect of the present disclosure, which may be used in combination with any other aspect or combination of aspects listed herein, encoding includes printing an indicia on the media.

In another aspect of the present disclosure, which may be used in combination with any other aspect or combination of aspects listed herein, encoding includes encoding an RFID tag in the media.

In another aspect of the present disclosure, which may be used in combination with any other aspect or combination of aspects listed herein, the calibration data is further based on a deployment state of the EEI material.

In another aspect of the present disclosure, which may be used in combination with any other aspect or combination of aspects listed herein, the calibration data is further based on at least one of an end state and a nominal end state of the EEI material.

In another aspect of the present disclosure, which may be used in combination with any other aspect or combination of aspects listed herein, the calibration data is further based on deployment data.

In another aspect of the present disclosure, which may be used in combination with any other aspect or combination of aspects listed herein, an optical property of the EEI material is configured to change between the current optical property and an end state optical property in response to a cumulative exposure to an environmental condition.

Aspects of the subject matter described herein may be useful alone or in combination with one or more other aspects described herein. In an aspect of the present disclosure, a system for reading an environmental exposure indicator comprising an indicia and an environmental exposure indicator ("EEI") material includes an image capture subsystem and a controller. The image capture subsystem is configured to capture an image of the environmental exposure indicator. The controller is configured to decode calibration data from the indicia, analyze the captured image to detect a current optical property of the EEI material, compare the detected property with the calibration data, and output an indication of the comparison. The calibration data is associated with a property of the EEI material at an earlier time.

Aspects of the subject matter described herein may be useful alone or in combination with one or more other aspects described herein. In an aspect of the present disclosure, a system for reading an environmental exposure indicator includes a processor, a memory coupled to the processor, and an optical input device coupled to the processor. The processor is configured to cause the optical input device to capture an image of a field of view. The field of view includes the environmental exposure indicator, which includes an indicia associated with an environmental exposure indicator material that is configured, responsive to the a cumulative exposure to an environmental condition, to undergo a continuous chemical or physical state change between a creation state and an end state, causing a change in an optical property of the environmental exposure indicator material. The environmental exposure indicator material has a deployment state, between the creation state and the end state, at a deployment time. The processor is further configured to store the image in the memory, process the image to identify the indicia within the captured image, and analyze the indicia to determine calibration data from the indicia based on the deployment state. The calibration data is configured to be used to adjust indications of the environmental exposure indicator provided by the environmental exposure indicator material to compensate for a difference between the deployment state and the creation state. Additionally, the calibration data includes at least one of (i) the creation data, (ii) the deployment data, and (iii) analysis data. The processor is further configured to determine an optical property associated with the environmental exposure indicator material, determine a characteristic of the environmental exposure indicator based on the calibration data and the determined optical property, and output the characteristic.

In another aspect of the present disclosure, which may be used in combination with any other aspect or combination of aspects listed herein, the calibration data includes a timestamp indicative of a time of manufacture of the environmental exposure material.

In another aspect of the present disclosure, which may be used in combination with any other aspect or combination of aspects listed herein, the calibration data includes an initial optical property associated with the creation state of the environmental exposure material.

In another aspect of the present disclosure, which may be used in combination with any other aspect or combination of aspects listed herein, the calibration data is encoded within the environmental exposure indicator.

In another aspect of the present disclosure, which may be used in combination with any other aspect or combination of aspects listed herein, the calibration data is linked to the environmental exposure indicator and obtained from an external database upon reading.

In another aspect of the present disclosure, which may be used in combination with any other aspect or combination of aspects listed herein, the optical property is a reflectance value, a saturation value, a color value, a color density value, an optical density value or a color hue value.

In another aspect of the present disclosure, which may be used in combination with any other aspect or combination of aspects listed herein, the indicia includes at least one of a symbol and a dataform.

In another aspect of the present disclosure, which may be used in combination with any other aspect or combination of aspects listed herein, the dataform is a machine readable symbol.

In another aspect of the present disclosure, which may be used in combination with any other aspect or combination of aspects listed herein, the machine readable symbol is a barcode symbol.

In another aspect of the present disclosure, which may be used in combination with any other aspect or combination of aspects listed herein, the barcode symbol is a two-dimensional barcode symbol that includes encoded data identifiers. A first data identifier indicates product life equation parameters associated with the optical property of the environmental exposure indicator material.

In another aspect of the present disclosure, which may be used in combination with any other aspect or combination of aspects listed herein, the product life equation parameters are Arrhenius equation parameters.

In another aspect of the present disclosure, which may be used in combination with any other aspect or combination of aspects listed herein, the encoded data identifiers further includes a second data identifier that indicates a size and a location of the environmental exposure indicator material.

In another aspect of the present disclosure, which may be used in combination with any other aspect or combination of aspects listed herein, the system is one of a barcode reader and a barcode scanner.

Aspects of the subject matter described herein may be useful alone or in combination with one or more other aspects described herein. In an aspect of the present disclosure, a system for reading an environmental exposure indicator includes a processor, a memory coupled to the processor, and an optical input device coupled to the processor. The processor is configured to cause the optical input device to read an optical value from an environmental indicator. The environmental indicator has an optical property that changes continuously from a creation state to an end state, and a rate of change of the optical property is dependent on exposure to an environmental condition. The processor is also configured to cause the optical input device to read digital data from an indicia associated with the environmental indicator. Based on the data from the indicia indicating a respective state of the environmental indicator at a deployment time before the indicia was printed, the processor is configured to determine an amount of exposure to the environmental condition since the deployment time. Additionally, the processor is configured to determine a property of a product associated with the environmental exposure indicator. The data from the indicia is configured to provide a calibration prior to determining the property of the product, and the property of the product is based on the calibration.

Aspects of the subject matter described herein may be useful alone or in combination with one or more other aspects described herein. In an aspect of the present disclosure, a method of reading an environmental exposure indicator includes scanning an indicia associated with an environmental exposure indicator material that is configured, responsive to a cumulative exposure to an environmental condition, to undergo a continuous chemical or physical state change between a creation state and an end state, causing a change in an optical property of the environmental exposure indicator material. The environmental exposure indicator material has a deployment state, between the creation state and the end state, at a deployment time. The method also includes determining calibration data encoded within the indicia based on the deployment state, the calibration data is configured to be used to adjust indications of the environmental exposure indicator provided by the environmental exposure indicator material to compensate for a difference between the deployment state and the creation state. Additionally, the method includes determining, at a time of scanning, an optical property associated with the environmental exposure indicator material, and determining a characteristic of the environmental exposure indicator based on the calibration data and the determined optical property.

In another aspect of the present disclosure, which may be used in combination with any other aspect or combination of aspects listed herein, the characteristic is a remaining product life of a product associated with the environmental exposure indicator.

In another aspect of the present disclosure, which may be used in combination with any other aspect or combination of aspects listed herein, the indicia includes at least one of a symbol and a dataform.

In another aspect of the present disclosure, which may be used in combination with any other aspect or combination of aspects listed herein, the dataform is a machine readable symbol.

In another aspect of the present disclosure, which may be used in combination with any other aspect or combination of aspects listed herein, the machine readable symbol is a barcode symbol.

In another aspect of the present disclosure, which may be used in combination with any other aspect or combination of aspects listed herein, the barcode symbol is a two-dimensional barcode symbol that includes encoded data identifiers, and a first data identifier indicates product life equation parameters associated with the optical determined optical property of the environmental exposure indicator material.

In another aspect of the present disclosure, which may be used in combination with any other aspect or combination of aspects listed herein, the product life equation parameters are Arrhenius equation parameters.

In another aspect of the present disclosure, which may be used in combination with any other aspect or combination of aspects listed herein, the encoded data identifiers further include a second data identifier that indicates a size and a location of the environmental exposure indicator material.

In another aspect of the present disclosure, which may be used in combination with any other aspect or combination of aspects listed herein, the first data identifier and the second data identifier are the same data identifier.

In another aspect of the present disclosure, which may be used in combination with any other aspect or combination of aspects listed herein, the environmental condition is selected from the group consisting of time, temperature, time-temperature product, and cumulative time-temperature.

In another aspect of the present disclosure, which may be used in combination with any other aspect or combination of aspects listed herein, the environmental exposure indicator material is configured to continuously change its respective optical property between the creation state and the end state when exposed to the environmental condition.

Aspects of the subject matter described herein may be useful alone or in combination with one or more other aspects described herein. In an aspect of the present disclosure, an environmental exposure indicator includes a substrate, an environmental exposure indicator material provided on the substrate, and an indicia provided on the substrate that is associated with the environmental exposure indicator. The environmental exposure indicator material is configured, responsive to a cumulative exposure to an environmental condition, to undergo a continuous chemical or physical state change between a creation state and an end state, causing a change in an optical property of the environmental exposure indicator material. The optical property provides exposure information indicating an amount of exposure to the environmental condition of the environmental exposure material since the environmental exposure material was in the creation state. The environmental exposure indicator has a deployment state, between the creation state and the end state, at a deployment time. Additionally, the indicia is associated with calibration data based on the deployment state, and the calibration data is configured to be used to adjust indications of the cumulative environmental exposure provided by the environmental exposure material to compensate for a difference between the deployment state and the creation state.

In another aspect of the present disclosure, which may be used in combination with any other aspect or combination of aspects listed herein, between the creation state and the end state is inclusive of the creation state.

In another aspect of the present disclosure, which may be used in combination with any other aspect or combination of aspects listed herein, the calibration data is configured to be used to determine an optical property range based on the deployment state.

In another aspect of the present disclosure, which may be used in combination with any other aspect or combination of aspects listed herein, the optical property range starts at the deployment state and ends at an intermediate state between the deployment state and the end state, and the intermediate state is one of a nominal end state and a calibrated end state.

In another aspect of the present disclosure, which may be used in combination with any other aspect or combination of aspects listed herein, the intermediate state is associated with a future optical property indicative of an end of a product life.

In another aspect of the present disclosure, which may be used in combination with any other aspect or combination of aspects listed herein, the calibration data includes at least one of (i) creation data, (ii) deployment data, and (iii) analysis data.

In another aspect of the present disclosure, which may be used in combination with any other aspect or combination of aspects listed herein, the deployment state is at least one of (i) estimated based on the creation state or a nominal creation state and exposure data and (ii) measured at the deployment time.

In another aspect of the present disclosure, which may be used in combination with any other aspect or combination of aspects listed herein, the calibration data includes one of (i) a measured optical property at the deployment time and (ii) inputs to calculate the deployment state.

In another aspect of the present disclosure, which may be used in combination with any other aspect or combination of aspects listed herein, the calibration data includes a link to one of (i) a measured optical property at the deployment time and (ii) inputs to calculate the deployment state.

In another aspect of the present disclosure, which may be used in combination with any other aspect or combination of aspects listed herein, the link provides access to a database that stores at least one of (i) the measured optical property at the deployment time and (ii) the inputs to calculate the deployment state.

In another aspect of the present disclosure, which may be used in combination with any other aspect or combination of aspects listed herein, the deployment state is associated with a current reflectance value.

In another aspect of the present disclosure, which may be used in combination with any other aspect or combination of aspects listed herein, the current reflectance value is determined at the deployment time, and the deployment time is when the indicia is provided on the substrate.

In another aspect of the present disclosure, which may be used in combination with any other aspect or combination of aspects listed herein, the indicia is at least one of (i) provided on the substrate along with calibration data and (ii) provided on the substrate along with a link to the calibration data.

In another aspect of the present disclosure, which may be used in combination with any other aspect or combination of aspects listed herein, the indicia at least one of (i) encodes the calibration data and (ii) encodes information needed to retrieve the calibration data from a data repository.

In another aspect of the present disclosure, which may be used in combination with any other aspect or combination of aspects listed herein, the calibration data includes a timestamp indicative of a time of manufacture of the environmental exposure material.

In another aspect of the present disclosure, which may be used in combination with any other aspect or combination of aspects listed herein, the calibration data includes a value of the optical property of the environmental exposure material in the deployment state.

In another aspect of the present disclosure, which may be used in combination with any other aspect or combination of aspects listed herein, the optical property is reflectance, saturation, color, color density, optical density or a color hue.

In another aspect of the present disclosure, which may be used in combination with any other aspect or combination of aspects listed herein, the environmental exposure indicator material is positioned in the indicia.

In another aspect of the present disclosure, which may be used in combination with any other aspect or combination of aspects listed herein, the indicia includes at least one of a symbol and a dataform.

In another aspect of the present disclosure, which may be used in combination with any other aspect or combination of aspects listed herein, the dataform is a machine readable symbol.

In another aspect of the present disclosure, which may be used in combination with any other aspect or combination of aspects listed herein, the machine readable symbol is a barcode symbol.

In another aspect of the present disclosure, which may be used in combination with any other aspect or combination of aspects listed herein, the barcode symbol is a two-dimensional barcode symbol that includes encoded data identifiers, and a first data identifier indicates product life equation parameters associated with the optical property of the environmental exposure indicator material.

In another aspect of the present disclosure, which may be used in combination with any other aspect or combination of aspects listed herein, the product life equation parameters are Arrhenius equation parameters.

In another aspect of the present disclosure, which may be used in combination with any other aspect or combination of aspects listed herein, the encoded data identifiers further include a second data identifier that indicates a size and a location of the environmental exposure indicator material.

In another aspect of the present disclosure, which may be used in combination with any other aspect or combination of aspects listed herein, the first data identifier and the second data identifier are the same data identifier.

In another aspect of the present disclosure, which may be used in combination with any other aspect or combination of aspects listed herein, the environmental condition is selected from the group consisting of time, temperature, time-temperature product, and cumulative time-temperature.

In another aspect of the present disclosure, which may be used in combination with any other aspect or combination of aspects listed herein, the environmental exposure indicator material is configured to continuously change its respective optical property between the creation state and the end state when exposed to the environmental condition.

In another aspect of the present disclosure, which may be used in combination with any other aspect or combination of aspects listed herein, the environmental exposure indicator material reaches an intermediate state between the creation state and the end state when the cumulative exposure to the environmental condition exceeds a threshold value.

In another aspect of the present disclosure, which may be used in combination with any other aspect or combination of aspects listed herein, the threshold value is associated with an end of a labeled product life.

In another aspect of the present disclosure, which may be used in combination with any other aspect or combination of aspects listed herein, the environmental exposure indicator material dynamically changes to a plurality of different states related to one of expended product life and remaining labeled product life.

Aspects of the subject matter described herein may be useful alone or in combination with one or more other aspects described herein. In an aspect of the present disclosure, a device includes a processor, a memory coupled to the processor, an image sensor communicatively coupled to the processor, and an imaging subsystem communicatively coupled to the processor. The processor is configured to obtain creation data associated with an environmental exposure indicator material provided on a substrate. The environmental exposure indicator material is configured, responsive to a cumulative exposure to an environmental condition, to undergo a continuous chemical or physical state change between a creation state and an end state, causing a change in an optical property of the environmental exposure indicator material. The processor is also configured to obtain deployment data of the environmental exposure indicator material. The environmental exposure indicator material has a deployment state, between the creation state and the end state, at a deployment time. Additionally, the processor is configured to cause the imaging subsystem to apply an indicia on the substrate. The indicia is associated with calibration data based on the deployment state, and the calibration data is configured to be used to adjust indications of the cumulative environmental exposure provided by the environmental exposure material to compensate for a difference between the deployment state and the creation state. The calibration data includes at least one of (i) the creation data, (ii) the deployment data, and (iii) analysis data.

In another aspect of the present disclosure, which may be used in combination with any other aspect or combination of aspects listed herein, obtaining deployment data includes one of (i) estimating the deployment state and (ii) measuring the deployment state.

In another aspect of the present disclosure, which may be used in combination with any other aspect or combination of aspects listed herein, obtaining deployment data includes causing the image sensor to read a current optical property of the environmental exposure indicator material to determine the deployment state.

In another aspect of the present disclosure, which may be used in combination with any other aspect or combination of aspects listed herein, the deployment state is estimated based on the creation state and exposure data.

In another aspect of the present disclosure, which may be used in combination with any other aspect or combination of aspects listed herein, the deployment data includes one of (i) a measured optical property at the deployment time and (ii) inputs to calculate the deployment state.

In another aspect of the present disclosure, which may be used in combination with any other aspect or combination of aspects listed herein, the deployment data includes a link to one of (i) a measured optical property at the deployment time and (ii) the inputs to calculate the deployment state.

In another aspect of the present disclosure, which may be used in combination with any other aspect or combination of aspects listed herein, the link provides access to a database that stores at least one of (i) the measured optical property at the deployment time and (ii) the inputs to calculate the deployment state.

In another aspect of the present disclosure, which may be used in combination with any other aspect or combination of aspects listed herein, the deployment state is associated with a current reflectance value, the current reflectance value is determined at the deployment time, and the deployment time is when the indicia is applied to the substrate.

In another aspect of the present disclosure, which may be used in combination with any other aspect or combination of aspects listed herein, the imaging subsystem is a print head, and causing the imaging subsystem to apply the indicia on the substrate includes causing the print head to print the indicia on the substrate.

In another aspect of the present disclosure, which may be used in combination with any other aspect or combination of aspects listed herein, the imaging subsystem is a laser etcher, and causing the imaging subsystem to apply the indicia on the substrate includes causing the laser etcher to etch the indicia into the substrate.

In another aspect of the present disclosure, which may be used in combination with any other aspect or combination of aspects listed herein, the calibration data is configured to be used to determine an optical property range based on the deployment state.

In another aspect of the present disclosure, which may be used in combination with any other aspect or combination of aspects listed herein, the optical property range starts at the deployment state and ends at an intermediate state between the deployment state and the end state.

In another aspect of the present disclosure, which may be used in combination with any other aspect or combination of aspects listed herein, the intermediate state is associated with a future optical property indicative of an end of a product life.

In another aspect of the present disclosure, which may be used in combination with any other aspect or combination of aspects listed herein, the deployment state is associated with an optical property of the environmental exposure indicator at the deployment state as read by the image sensor.

In another aspect of the present disclosure, which may be used in combination with any other aspect or combination of aspects listed herein, the optical property is a reflectance value, saturation value, color value, color density value, optical density value or color hue value.

In another aspect of the present disclosure, which may be used in combination with any other aspect or combination of aspects listed herein, the image sensor is configured to measure the optical property to obtain the deployment data. Responsive to obtaining the deployment data, the imaging subsystem is configured to apply the indicia. Additionally, the indicia is based, at least in part, on the measured optical property.

In another aspect of the present disclosure, which may be used in combination with any other aspect or combination of aspects listed herein, at least a portion of the calibration data associated with the environmental exposure indicator material is provided on the substrate prior to supplying the device with the substrate.

In another aspect of the present disclosure, which may be used in combination with any other aspect or combination of aspects listed herein, the imaging subsystem is configured to at least one of (i) apply the indicia on the substrate along with calibration data and (ii) apply the indicia on the substrate along with a link to the calibration data.

In another aspect of the present disclosure, which may be used in combination with any other aspect or combination of aspects listed herein, the indicia at least one of (i) encodes the calibration data and (ii) encodes information needed to retrieve the calibration data from a data repository.

In another aspect of the present disclosure, which may be used in combination with any other aspect or combination of aspects listed herein, the creation data includes a timestamp indicative of a time of manufacture of the environmental exposure material.

In another aspect of the present disclosure, which may be used in combination with any other aspect or combination of aspects listed herein, the image sensor is caused to read a respective optical property of the environmental exposure indicator material, and the processor is further configured to compare the respective optical property to at least a portion of the calibration data.

In another aspect of the present disclosure, which may be used in combination with any other aspect or combination of aspects listed herein, the processor is configured to cause the imaging subsystem to apply the indicia on the substrate such that the environmental exposure indicator material is positioned in the indicia.

In another aspect of the present disclosure, which may be used in combination with any other aspect or combination of aspects listed herein, the indicia includes at least one of a symbol and a dataform.

In another aspect of the present disclosure, which may be used in combination with any other aspect or combination of aspects listed herein, the dataform is a machine readable symbol.

In another aspect of the present disclosure, which may be used in combination with any other aspect or combination of aspects listed herein, the machine readable symbol is a barcode symbol.

In another aspect of the present disclosure, which may be used in combination with any other aspect or combination of aspects listed herein, the barcode symbol is a two-dimensional barcode symbol that includes encoded data identifiers, and a first data identifier indicates product life equation parameters associated with the optical property of the environmental exposure indicator material.

In another aspect of the present disclosure, which may be used in combination with any other aspect or combination of aspects listed herein, the product life equation parameters are Arrhenius equation parameters.

In another aspect of the present disclosure, which may be used in combination with any other aspect or combination of aspects listed herein, the encoded data identifiers further include a second data identifier that indicates a size and a location of the environmental exposure indicator material.

In another aspect of the present disclosure, which may be used in combination with any other aspect or combination of aspects listed herein, the first data identifier and the second data identifier are the same data identifier.

In another aspect of the present disclosure, which may be used in combination with any other aspect or combination of aspects listed herein, the environmental condition is selected from the group consisting of time, temperature, time-temperature product, and cumulative time-temperature.

In another aspect of the present disclosure, which may be used in combination with any other aspect or combination of aspects listed herein, the device is a printer.

Aspects of the subject matter described herein may be useful alone or in combination with one or more other aspects described herein. In an aspect of the present disclosure, a system for reading an environmental exposure indicator includes a light source configured to illuminate the environmental exposure indicator, an image capture subsystem, and a controller. The image capture subsystem has a two-dimensional detector and is configured to capture image data. Additionally, the image capture subsystem is configured to receive light from the environmental exposure indicator during a time period. The environmental exposure indicator includes an indicia associated with an environmental exposure indicator material that is configured, responsive to a cumulative exposure to an environmental condition, to undergo a continuous chemical or physical state change between a creation state and an end state, causing a change in an optical property of the environmental exposure indicator material. The environmental exposure indicator material has a deployment state, between the creation state and the end state, at a deployment time. The image capture subsystem is also configured to capture at least one image from the received light. The controller is configured to analyze one of the at least one image to decode calibration data from the indicia based on the deployment state. The calibration data is configured to be used to adjust indications of the environmental exposure indicator provided by the environmental exposure indicator material to compensate for a difference between the deployment state and the creation state. Additionally, the calibration data includes at least one of (i) the creation data, (ii) the deployment data, and (iii) analysis data. The controller is also configured to analyze one of the at least one image to detect a current optical property of the environmental exposure indicator material according to the received light and associate a characteristic of the indicia with the detected current optical property. The characteristic is based on the calibration data and the detected current optical property. The controller is also configured to output the associated characteristic.

Additional features and advantages of the disclosed system, method, and apparatus are described in, and will be apparent from, the following Detailed Description and the Figures.

BRIEF DESCRIPTION OF THE FIGURES

FIGS. 6A and 6B are representations of an environmental exposure indicator according to an example of the present disclosure.

DETAILED DESCRIPTION OF EXAMPLE EMBODIMENTS

Figure 1A:
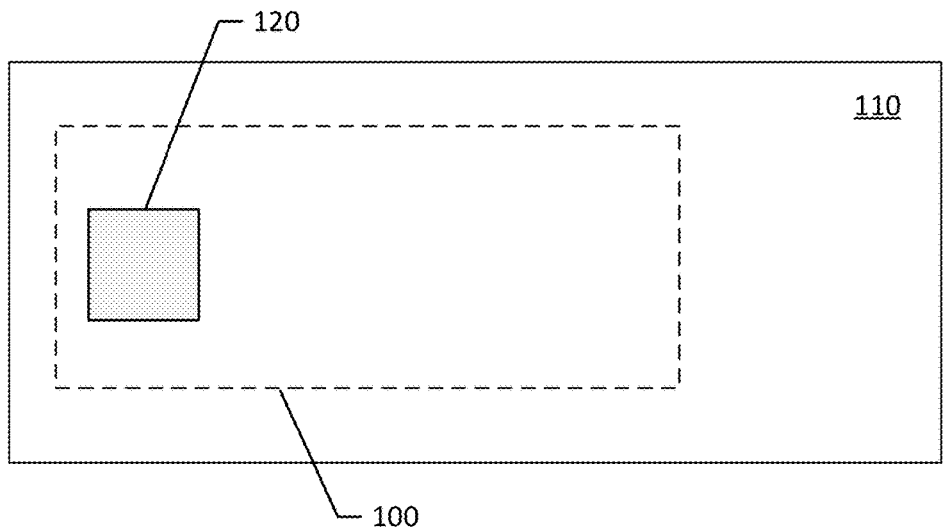
FIGS. 1A, 1B and 1C illustrate an example environmental exposure indicator 100 through various stages of manufacturing and environmental exposure according to an example of the present disclosure.

Environmental exposure indicator materials ("EEI materials") may be associated with indicia (e.g., machine-readable codes, such as barcodes) to create an environmental exposure indicator ("EEI") that is applied to a product to track the product's exposure to an environmental condition. For example, (i) temperature sensitive products, such as frozen food product(s) may include an EEI that tracks the food product's exposure to temperatures above freezing, (ii) light sensitive products, such as film product(s) may include an EEI that tracks the film product's exposure to UV light, (iii) moisture sensitive products, such as semiconductors and other electronic product(s) may include an EEI that tracks the electronic product's exposure to humidity, etc.

Some example, environmental exposure indicators include HEATmarker®, available from Zebra Technologies' Temptime Division, which is a time-temperature indicator provided as a self-adhesive label that can be applied directly to temperature sensitive products. HEATmarker® gradually changes color as heat exposure accumulates. An example peak or threshold temperature exposure indicator is the Safe-T-Vue® indicator, available from Zebra Technologies' Temptime Division. Safe-T-Vue® indicators are nonreversible temperature indicators for blood products and temperature-sensitive biologics. The Safe-T-Vue® indicator attaches directly to a blood bag and is adapted for maintaining quality control during temporary storage and transport. In an example, the Safe-T-Vue® indicator changes color from white to red when a specified temperature has been reached or exceeded.

In response to exposure to a specified environmental condition, the EEI materials may change state (e.g., an optical property, such as color or reflectance) to indicate the amount of exposure. For example, an EEI material may change from an initial state (e.g., white color) to an end state (e.g., red color) in response to exposure to a specified environmental condition (e.g., temperature exposure). This transition may occur gradually in response to the environmental condition over time. The EEI material may be carefully tuned so that the response of the product is similar to that of a product to be monitored, so that the EEI material transitions to a particular state at a time when the product should be judged no longer acceptable and should be discarded, rather than used. In an ideal scenario, the property, e.g., an optical property, such as reflectance, of the EEI material does not change from its initial state (e.g., reflectance value at the time of manufacturing) until the EEI material is associated with indicia (e.g., machine-readable codes, such as barcodes) to create an environmental exposure indicator ("EEI") that is applied to a product. However, unwanted progression often occurs with the EEI material before the EEI material is associated with the indicia or a product. Specifically, after the EEI material (e.g., time-temperature sensitive material) is manufactured, the EEI material may start progressing. For example, the property, e.g., an optical property, of the EEI material may start to change due to exposure of temperature, UV light, moisture, and/or time. This unwanted progression may occur during shipping and/or storage of the EEI material. This will result in the EEI material less accurately reflecting the state of the product, and reaching the end state before the product would reach an unacceptable state, thereby causing the undesirable disposal of product that would otherwise be acceptable.

The unwanted progression may reduce the accuracy in tracking the product's exposure to an environmental condition. In an illustrative example, a moisture sensitive EEI material that has unwanted exposure before being applied to a moisture sensitive product (e.g., a semiconductor) may not accurately track the semiconductor's humidity exposure. Specifically, if the EEI material has already progressed 15 percent to 20 percent beyond its initial state (due to humidity exposure during storage or shipping) before being associated with an indicia to create a humidity indicator label for the semiconductor, then the semiconductor may appear to be unusable (e.g., beyond an upper threshold of humidity exposure requiring the semiconductor to be discarded) once the EEI material reaches its end state. However, since 15 to 20 percent of the humidity exposure occurred before the EEI material was associated with the semiconductor, the semiconductor is in fact still usable as the semiconductor has not yet experienced the upper limit of humidity.

In another illustrative example, a medication may become unusable after 10 minutes of exposure to temperatures above 40° F. and a temperature sensitive EEI material used to create an EEI to track the time-temperature exposure history of the medication may experience temperature exposure during shipping or storage. Specifically, the EEI material may experience some exposure (e.g., three minutes of exposure) to temperatures above 40° F. during shipping, storage, or while handling the EEI material. Once the EEI material is applied to the medication, thirty percent (e.g., three minutes of the 10 minutes of exposure to temperatures above 40° F.) of the allowable temperature exposure has already occurred. Therefore, even if the medication has only experienced 8 minutes of exposure to temperatures above 40° F., the EEI will indicate that the medication has exceeded its allowable temperature exposure thresholds (e.g., 10 or more minutes of exposure to temperatures above 40° F.) even though the medication is still usable. In the above example, the EEI material may change state (e.g., optical property, such as reflectance) based on the exposure. Specifically, the reflectance of the EEI material may be read to determine whether the associated product (e.g., medication) is usable. Thus, the premature progression of the EEI material before being applied or incorporated into an EEI to track a product disadvantageously leads to waste and inaccurate environmental tracking.

By determining a current property, e.g., an optical property such as reflectance, of the EEI material before associating the EEI material with the indicia (e.g., barcode), the current property may be used to calibrate the sensor information provided by the EEI. For example, the current reflectance, which may be estimated or measured, may be used to set a new initial reflectance (e.g., initial state of the EEI material) and a new endpoint reflectance (e.g., end state of the EEI material), which typically differ from the initial reflectance and endpoint reflectance at the time of the EEI material is manufactured. Furthermore, by setting the new initial reflectance and the new endpoint reflectance, the full reference window for the EEI is advantageously restored thereby providing more accurate readings throughout the EEI's and associated product's life. The new initial reflectance and the new endpoint reflectance may be stored as calibration data that is then dynamically stored in the indicia (e.g., barcode). For example, if the indicia is a barcode, the barcode may include the calibration data such that when scanned, the barcode is capable of calibrating a reader, such that the reader determines an output from the environmental sensor based on environmental history since the deployment time instead of since the time of manufacturing.

As used herein, an "EEI material" refers to a material that changes state in a detectable way in response to a predetermined environmental condition. In an example, the "EEI material" is configured to undergo a continuous chemical or physical state change between a "creation state" and an "end state". The change of state may be a change in a property, e.g., an optical property, such as a reflectance value, saturation value, color value, color density value, optical density value or color hue value of the "EEI material". Specifically, the state change (e.g., optical property change) provides exposure information indicating an amount of exposure to the environmental condition of the EEI material since the EEI was in the "creation state."

As used herein, exposure to an "environmental condition" is exposure to conditions such as temperature (e.g., heat), moisture (e.g., humidity), light (e.g., UV), etc.

As used herein, "creation state" refers to a state of the EEI material at a time of creation (e.g., when the EEI material is manufactured). For example, the EEI material may be applied to a roll or strip of printable media, which is then shipped to customers for creating EEIs. As soon as the EEI material is applied to the printable media, the EEI material may start changing based on environmental exposure.

As used herein, "end state" refers to a state of the EEI material that is indicative of a maximum environmental exposure for the EEI material. Specifically, in the "end state" there is no more discernable progression (e.g., change in an optical property) of the EEI material once the EEI material is in the end state. In an example, the "end state" may be indicative of an end of life of a product. However, in many cases, the "end state" may be a state beyond a "threshold end state" that is indicative of the end of life of a product. For example, the EEI material may reach a "threshold end state", which is near the true "end state", but any progression beyond the "threshold end state" may be difficult to discern and therefore may be deemed unusable for commercial purposes. Depending on the composition of the EEI material and its progression characteristics, the "end state" and the "threshold end state" may be the same state.

As used herein, "deployment state" refers to a state of the EEI material at a "deployment time" (e.g., the time the EEI material is created into an EEI and associated with a product. The "deployment state" may be any state between, and including the "creation state" and the "end state". In an example where the EEI is created immediately after the EEI material is created, the "deployment state" may be the same as the "creation state".

As used herein, "deployment time" refers to the time the EEI material is used to create an EEI and associated with a product.

As used herein, "calibrated end state" refers to a state of the EEI material that is indicative of a maximum allowable environmental exposure for a product. For example, once the EEI material progresses from the "deployment state" to the "calibrated end state", that is the maximum amount of environmental exposure for the associated product according to a reader that is calibrated by "calibration data".

As used herein, "nominal" refers to a state that is predetermined or selected by a user. Specifically, a "nominal creation state" may be selected such that there is a buffer between the "creation state" and the "nominal creation state". Similarly, a "nominal end state" may be selected such that there is a buffer between the "end state" and the "nominal end state". The "nominal creation state" and the "nominal end state" may be interpreted by a reader, scanner or other image capture device as the "creation state" and the "end state" as opposed to the actual state of the indicator. Specifically, the reader, scanner or other image capture device may interpret the "EEI material" in terms of its transition between the "nominal creation state" and the "nominal end state".

As used herein, "calibration data" refers to any "creation data", "deployment data" and/or "analysis data".

As used herein, "creation data" refers to any data associated with the EEI material at the time of creation. The "creation data" may include a timestamp, the property, e.g., an optical property, of the EEI material in the "creation state", the estimated "end state", etc.

As used herein, "deployment data" refers to any data associated with the EEI material at the "deployment time". The "deployment data" may include a timestamp, the property, e.g., an optical property, of the EEI material in the "deployment state", the estimated "calibrated end state", etc.

As used herein, "analysis data" refers to any data associated with analyzing optical properties of the EEI material and associating the property, e.g., an optical property, with a product characteristic, such as lifetime, usable life, etc.

As used herein, a "barcode symbol" is a machine-readable pattern encoding data. The barcode symbol is one type of dataform. Other types or examples of dataforms include text, numbers, graphics, etc. Text is a dataform representing written language, numbers are dataforms representing arithmetical values, and graphics are dataforms representing images.

A barcode symbol may be made up of one or more barcode elements, which may be referred to as a barcode module. An element or module is a set of contrasting patterns that are arranged on a substrate to facilitate decoding data by a barcode reader or scanner. A barcode element or module may describe both a "black" box and a "white" box, or a "light absorbing" box and a "light reflective" box. In other examples, a barcode element or module may also describe a "light emitting" element. Some barcode symbols include quiet space(s), a region surrounding a set of elements or modules, which is free of contrasting marks, to enable the barcode reader to detect the barcode symbol in a captured image. Some barcode symbols include elements or modules, called finder patterns, that provide a consistent pattern to enable the barcode reader to detect the barcode symbol in a captured image.

The manner in which data is encoded in the barcode symbol, the arrangement of the barcode elements or modules within the barcode symbol, and any requirements for elements or modules and quiet space are defined by a set of rules, known as a barcode symbology. Data may be encoded into the contrasting patterns by software, such as a computer application or printer firmware.

Barcode symbols, which may be generally referred to herein as barcodes, may be displayed on a screen or marked on a substrate. Barcode elements or modules may be marked on a substrate with a variety of printing or imaging methods and techniques. Black bars (rectangles, squares, circles, or triangles, or other shapes are generally called bars, or elements, in a barcode) may be printed on a white or mirrored substrate to create the contrasting pattern of an element or module. Similarly, white patterns may be printed on a black or transparent substrate to create the contrasting pattern of an element or module. In either case, a barcode reader would capture an image of the barcode by receiving light reflected from the white portions of the element or module at a greater intensity than light reflected from the black portions of the element or module. The contrasting intensity pattern of the captured image is then processed by the barcode reader to decode the data carried by the barcode. In some embodiments, a reflective or mirrored surface may provide the contrasting pattern. Barcode elements or modules may also be marked on a substrate by etching or denting a smooth surface; in this case light is received at different intensities from a smooth surface than the textured surface.

In some embodiments, the contrasting pattern comprises two different visible colors. The two different visible colors reflect light of different frequencies. Barcode readers receive and filter the light then process the captured image to decode the data carried by the barcode. Either or both intensity and frequency of the received light may be processed to decode the data. In some embodiments, the contrasting pattern received by the barcode reader comprises at least one light emitted by the barcode. For instance, an electronic screen may display a barcode element or module using at least two different visible colors to create the contrasting pattern; the barcode reader receives and filters the light then processes the captured image to decode the data. An electronic screen may flash a rendition of an element or module, a barcode, or of multiple barcodes to exchange data with the barcode reader.

EEI materials, such as inks, toners, dyes, paints, waxes and other coatings, may be provided on products, packaging, and labels due to the increasing need for monitoring environmental exposure experienced by products through the supply chain. The EEI material may change state, e.g., by either changing color, reflectance or some other property, e.g., optical property, when exposed to particular environmental condition. The environmental condition(s) required to trigger the state change, color change or change in optical property may vary. The EEI materials may be provided on labels, tags or other sensors to monitor or track environmental exposure for the product associated with the label, tag or other sensor.

The apparatus, systems, methods and techniques described herein discuss calibration of EEI materials after incorporating the EEI materials, such as a temperature exposure indicator materials with labels, barcodes, etc. The EEI material may form an EEI or an EEI indicia. The EEI material may also referred to as an active material or a dynamic material.

The EEI material may be incorporated in or used in conjunction with labels, barcodes, etc. For example, media such as tags, labels, cards, wristbands, and/or ribbons containing this EEI material can be used in conjunction with printers, displays, vision systems, and hand-held devices (e.g., for reading and verification). The EEI material may be utilized to provide environmental exposure tracking on products carrying labels or indicia, such as 2D barcodes, to enhance environmental exposure traceability.

Figure 1B:
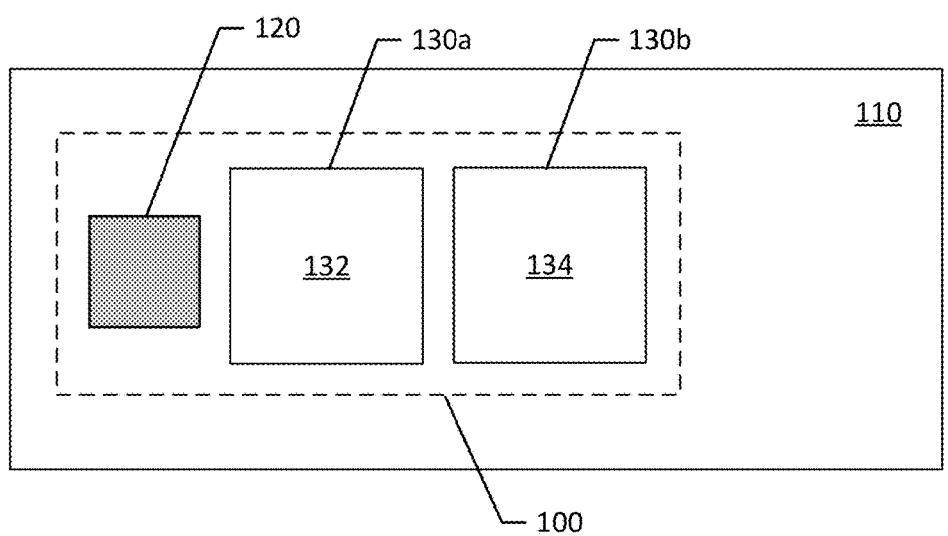
Figure 1C:
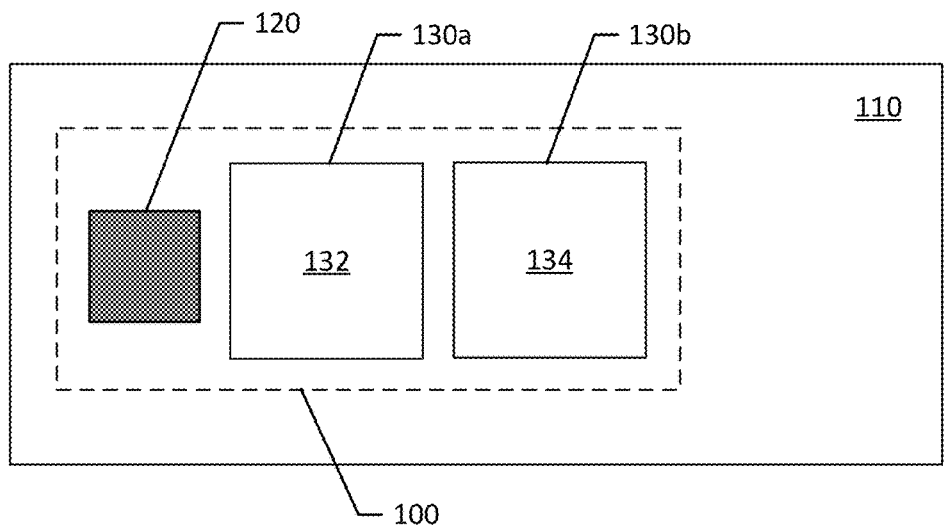

FIGS. 1A-1C illustrate an example environmental exposure indicator 100 in various stages of the manufacturing process and at different levels of exposure to an environmental condition. FIG. 1A illustrates an environmental exposure indicator ("EEI") material 120 provided on a substrate 110. As illustrated in FIG. 1A, the EEI material 120 is in a creation state before the EEI material 120 is associated with an indicia (e.g., indicia 130a and/or indicia 130b, hereinafter referred to generally as indicia 130) or used to create an EEI 100. Once the EEI material 120 is used to create an EEI 100, as illustrated in FIG. 1B, the EEI 100 is in the deployment state at a deployment time. As illustrated in FIG. 1B, the EEI material 120 has shown progression from its creation state illustrated in FIG. 1A to the deployment state illustrated in FIG. 1B. Specifically, the deployment state or the state at the deployment time may represent the time the EEI material 120 is associated with other data or indicia 130 thereby creating an EEI 100 that is attached to a product. The environmental progression that occurs between FIGS. 1A and 1B may be due to environmental exposure that the EEI material 120 experiences during storage, shipping, etc. prior to being associated with indicia 130. In one example, the substrate 110 may be a roll or strip of paper that includes the EEI material 120, which is then shipped to a customer to create an EEI 100.

For example, the EEI 100 illustrated in FIG. 1B may be used to create a label or tag that is applied to a product such that the EEI 100 can track the environmental exposure history the product experiences throughout the supply chain. FIG. 1C illustrates the EEI 100 after deployment while the EEI 100 is applied to the product. As illustrated in FIG. 1C, the EEI material 120 appears even darker than in FIG. 1B, which indicates that the product, and more specifically the EEI material 120, has experienced additional exposure to the specific environmental condition that the EEI material 120 is sensitive to. The state of the EEI material 120 in FIG. 1C may be the end state. Referring back to FIG. 1A, the EEI material 120 is the lightest, indicating the creation state before the EEI material 120 has been exposed to the specific environmental condition. Then, FIG. 1B shows the EEI material 120 after some exposure and FIG. 1C shows the EEI material 120 after even more exposure. Specifically, as illustrated in FIG. 1C, the EEI material 120 appears darker indicating additional environmental exposure since the deployment time.

The EEI material 120 may be responsive to (i) a cumulative exposure of a first environmental condition before the deployment time and (ii) a cumulative exposure of a second environmental condition (although it may be additional exposure to a condition of the same type) after the deployment time. In an example, the EEI material 120 may comprise different components or may be a combination of different EEI materials 120 such that one of the components or materials is responsive to (i) while the other component or material is responsive to (ii). In another example, the EEI material 120 may be responsive to multiple environmental conditions, such as diacetylene, which is responsive to both temperature and UV. In the illustrated example, the EEI material 120 is responsive to a cumulative exposure of the same environmental condition (e.g., temperature) both before the deployment time and after the deployment time. Furthermore, in the illustrated example, the property, e.g., optical property, of the EEI material 120 changes based on the cumulative exposure to the environmental condition. For example, the optical property may be reflectivity of light, such that as the EEI material 120 changes between the creation state and the end state, the optical property of the EEI material 120 dynamically changes between the creation state and the end state. In one example, the EEI material 120 may exhibit a low reflectivity of light in the creation state, which dynamically progresses to a higher and higher reflectivity of light as the EEI material 120 transitions from the creation state to the end state. In another example, the EEI material 120 may exhibit a high reflectivity of light in the creation state and may dynamically progress to a lower reflectivity of light as the EEI material 120 transitions to the end state.

In several of the examples described herein, changes in optical properties, such as changes in reflectance of the EEI material, are provided to describe the state change of the EEI material. It should be appreciated that the change of state may be a change in a property other than an optical property. Specifically, other property changes may apply to the descriptions below even though optical property changes are used as examples.

As illustrated in FIGS. 1B and 1C, the EEI 100 may include one or more indicia (e.g., indicia 130a and 130b), such as a machine-readably symbol (e.g., barcode 132), an RFID tag 134 or both. Calibration data may be encoded in the one or more indicia 130. Even though the EEI material 120 is illustrated as separate from the indicia 130 in FIGS. 1B and 1C, as described in more detail in FIGS. 6A, 6B, 7A, 7B, 8A and 8B below, the EEI material 120 may be integrated within the indicia 130, and may even operate as part of the indicia, which may change over time as described in U.S. Pat. Nos. 10,318,781; 10,546,172; U.S. patent application Ser. No. 16/526,505 and U.S. patent application Ser. No. 16/526,527.

Figure 2A:
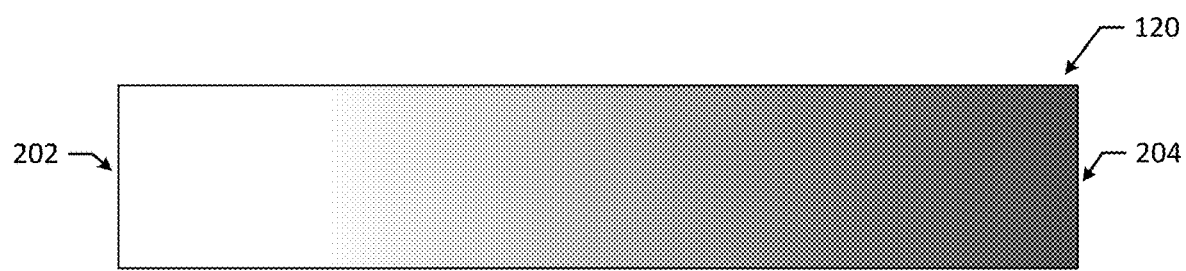
FIGS. 2A, 2B, 2C and 2D are representations of a progression of an environmental exposure indicator material according to examples of the present disclosure.
Figure 2B:
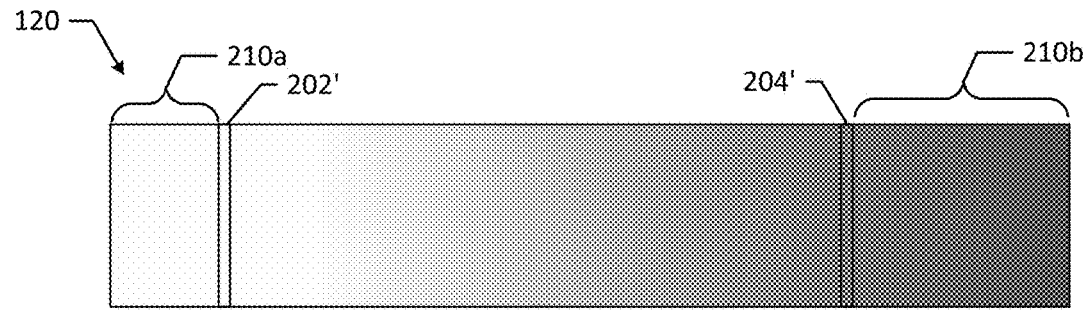

FIGS. 2A, 2B, 2C and 2D further illustrate the advantages provided by the calibration data and disadvantages of creating an EEI 100 without using calibration data. For example, FIG. 2A illustrates the progression of the EEI material 120 between the creation state 202 and the end state 204. Specifically, as the EEI material 120 experiences environmental exposure to a specific environmental condition, a property, e.g., an optical property (illustrated as color or the level of darkness in FIGS. 2A-2D), of the EEI material 120 dynamically changes. For illustrative purposes, the examples in FIGS. 2A-2D are described in relation to temperature exposure. The creation state 202 of the EEI material 120 in FIG. 2A is shown as white, indicating no temperature exposure on the far left of the exposure history. The end state 204 of the EEI material 120 in FIG. 2A is shown as dark gray and is representative of a fully activated EEI material 120. For example, one could imagine the EEI material 120 as a film, with the end state 204 being fully developed.

However, in practice, the optical properties associated with the creation state 202 and the end state 204 may be predetermined, e.g., by appropriately tuning the properties of the EEI material, to improve the usability of the EEI material 120. In the illustrated example, buffers 210a and 210*b* may be provided such that the nominal creation state 202' and the nominal end state 204' (as recognized by a reader) are offset from the true creation state 202 and the true end state 202 illustrated in FIG. 2A. One reason for buffers 210*a* and 210*b*, hereinafter referred to buffer(s) 210, may be to improve accuracy when measuring a property, e.g., an optical property, of the EEI material 120. For example, the EEI material 120 may rapidly progress from creation state 202 (illustrated in FIG. 2A) to the nominal creation state 202' (illustrated in FIG. 2B) without much of discernable change in the optical property. Furthermore, the optical property of the end state 204 (illustrated in FIG. 2A) may be nearly identical to the optical property of the nominal end state 204' (illustrated in FIG. 2B), such that a reader is programed to view the nominal end state 204' as a fully "developed" EEI material 120. Another advantage of buffer 210*b* may be to ensure that a reader can determine an exact time the EEI material 120 reaches the nominal end state 204'. For example, if an EEI 100 associated the end of a product's life with the end state 204 of the EEI material 120 as illustrated in FIG. 2A, the EEI material 120 could sit fully "developed" for a week with no further changes in its associated optical property, since the EEI material 120 already reached the end state 204. Therefore, regardless of the additional environmental exposure experienced by the EEI material 120, the EEI material 120 would remain in the end state 204, making it unclear exactly when the product expired. By using buffer 210*b*, the EEI material 120 may progress further, thereby allowing a reader to potentially determine when the product expired or how far beyond expiration the product is.

The various optical properties between the nominal creation state 202' and the nominal end state 204' creates an optical property range or window 215. Specifically the range or window 215 may represent each respective optical property within a product's usable life, such that a reading of any optical property within that range or window 215 would indicate that the product is still usable, and a reading outside the range or window 215 (e.g., a reading of an optical property to the right of window 215) would indicate that the product is no longer usable or expired.

Figure 2C:
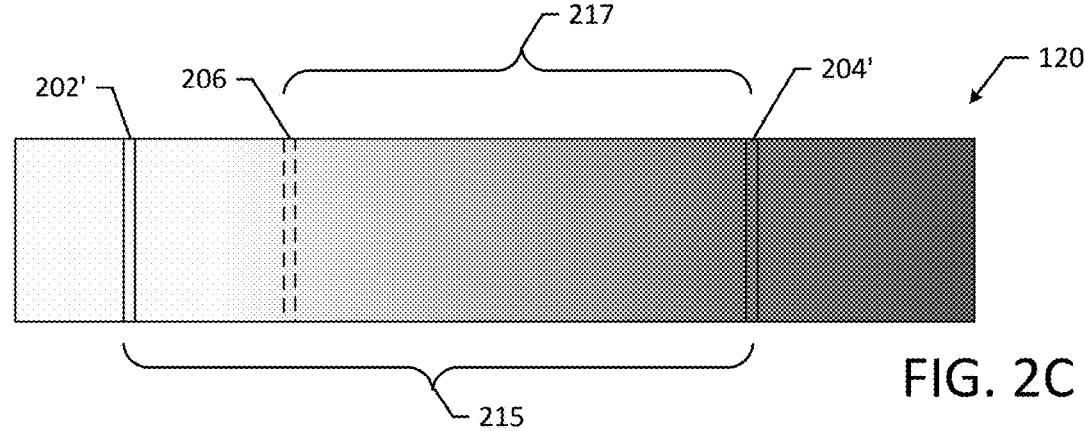

However, as discussed above, in many instances, the EEI material 120 may experience unwanted progression or "development" due to environmental exposure during shipping, storage, etc. before the EEI material 120 is used to create an EEI 100. As illustrated in FIG. 2C, the EEI material 120 may be deployed (e.g., used to create an EEI 100 and associated with a product) at a deployment time after a non-insignificant amount of environmental exposure. The optical property of the EEI material 120 at the deployment time is considered a deployment state 206. For example, temperature exposure during shipping or storage of the EEI material 120 may account of 15-20% of the usable range or window 215. Specifically, the deployment state 206 of the EEI material 120 may be well ahead (e.g., further progressed or developed) of the nominal creation state 202' thereby effectively reducing the window 215 to a reduced range or window 217.

The unwanted progression may reduce the accuracy in tracking the product's exposure to an environmental condition. Thus, when the EEI 100 created from the EEI material 120 is associated with a product, the product may appear to be unusable (e.g., beyond an upper threshold of temperature exposure requiring the product to be discarded) once the EEI material 120 reaches its nominal end state 204' even though 15-20% of the temperature exposure occurred before the EEI material 120 was associated with the product. Thus, even though the product is in fact still usable, the EEI 100 made from the EEI material 120 indicates that the product has exceeded its maximum allowable temperature exposure.

Figure 2D:
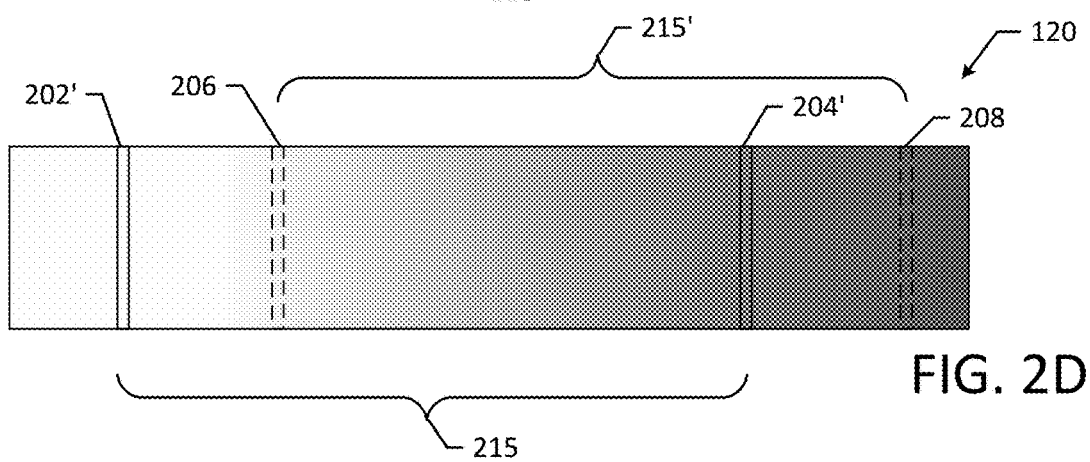

As illustrated in FIG. 2D, calibration data may be used to adjust or calibrate the EEI 100 to shift the range or window 215 to a new usable range or window, which may also be referred to a calibrated range or window 215'. Specifically, an optical property at the deployment state 206 may be determined and used to determine a new end state, which may be referred to as a calibrated end state 208. The calibrated range or window 215' accounts for any pre-deployment environmental exposure (e.g., temperature exposure) experienced by the EEI material 120 prior to being deployed (e.g., applied to a product as an EEI 100). After calibrating the EEI 100, or more specifically reading of the EEI material 120, the EEI 100 may advantageously track the full range of environmental exposure (e.g., temperature exposure) experienced by the product and therefore accurately represent the environmental exposure experienced by the product post-deployment. By calibrating the EEI 100 in such a manner, the EEI 100 may retain full usability even after pre-deployment exposure.

Figure 3:
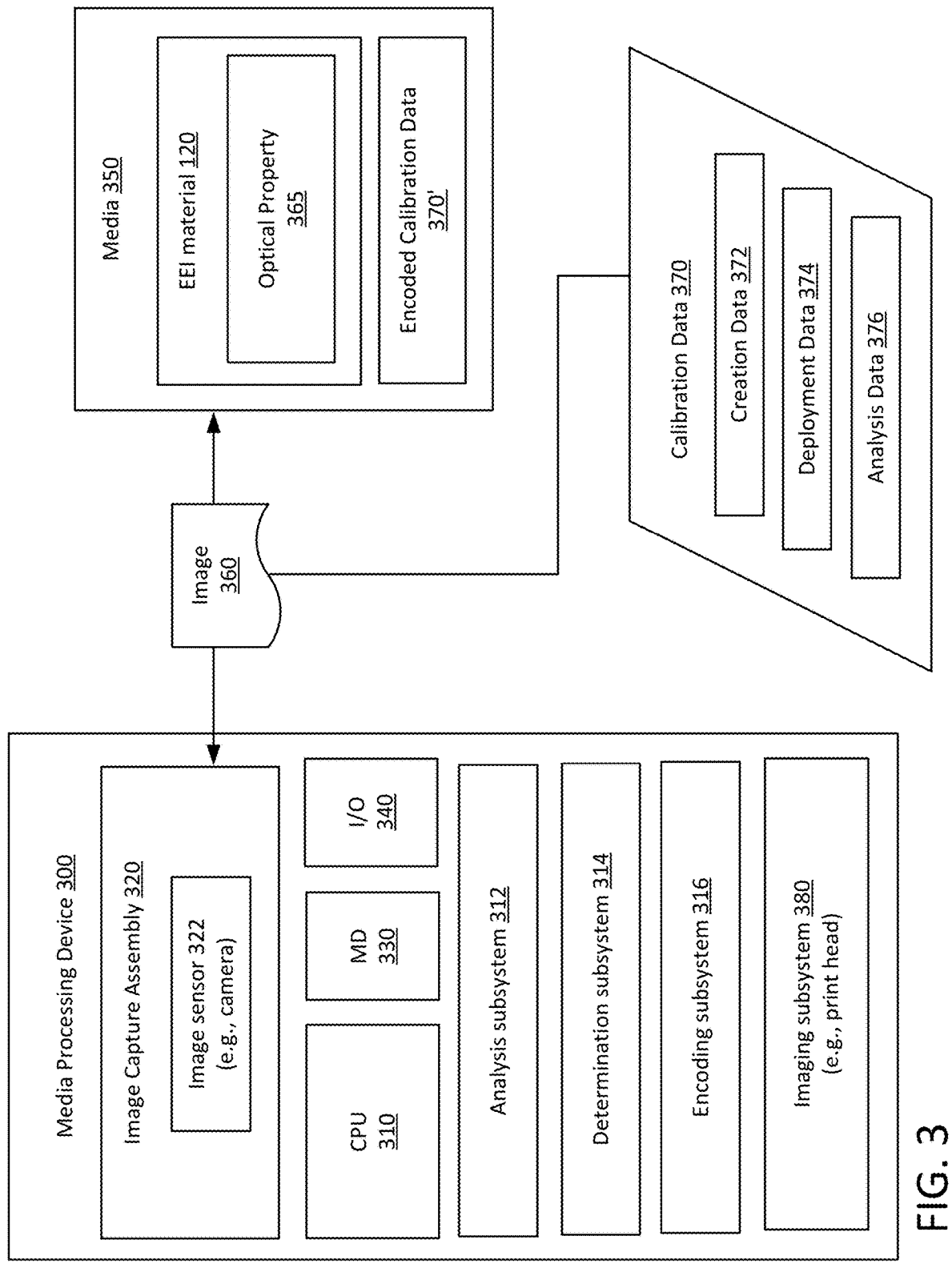
FIG. 3 is a block diagram of an example media processing device interacting with media according to an example of the present disclosure.

A media processing device may be used to determine calibration data and then (i) create an EEI 100, (ii) complete creation of a partially formed EEI 100, (iii) update an EEI 100, based on the determined calibration data. FIG. 3 illustrates an example of a media processing device 300, which may be an industrial scanner, a printer, a laser etching machine, an engraving machine, a digital camera, or any combination thereof. For example, the media processing device 300 may be an industrial printer, such as Zebra's ZT600 Series Industrial Printer, which may have its software or firmware appropriately modified to carry out the operations described in the present disclosure. As illustrated in FIG. 3, a media processing device 300 may include a processor (e.g., CPU 310) and an image capture assembly 320. The media processing device 300 may also include memory (e.g., a memory device 330) and an input/output ("I/O") device 340. Furthermore, the media processing device 300 may include an analysis subsystem 312, a determination subsystem 314 and an encoding subsystem 316. One or more of the analysis subsystem 312, determination subsystem 314 and encoding subsystem 316 may be specialized subsystems that make up the CPU 310. Conversely, one or more of the analysis subsystem 312, a determination subsystem 314 and an encoding subsystem 316 may be their own processing subsystems that reside on separate CPUs, GPUs or other processing equipment.

The image capture assembly 320 may be configured to capture an image 360 of a media 350 (e.g., a tag or label) comprising the EEI material 120. In an alternative example, an optical property of the EEI material 120 may be measured directly, e.g., by a sensor, reader or scanner, e.g., a dedicated handheld reader to read and analyze the EEI material 120, such as a modified handheld reader provided by Zebra Technologies. The media 350 may be an EEI 100. The image capture assembly 320 may also be configured to analyze the captured image 360 to detect a current optical property 365 of the EEI material 120. Based on the detected optical property, appropriate calibration data 370 for the EEI may be determined, e.g., indicating how much exposure the EEI may have already had to the relevant environmental condition based on the detected optical property 365. The image capture assembly may also be configured to provide information to the encoding subsystem 316 and/or the imaging subsystem 380, such that the encoding subsystem 316 and/or the imaging subsystem 380 may encode the calibration data 370 to the media 350, which is illustrated in FIG. 3 as encoded calibration data 370'. The image capture assembly 320 may first provide information to the CPU 310, analysis subsystem 312, determination subsystem 314 or a combination thereof, which may then communicate appropriate information to either the encoding subsystem 316, the imaging subsystem 380 or both for encoding the calibration data 370 to the media 350.

In an example, the analysis subsystem 312 may be configured to analyze the captured image 360 to detect the current optical property 365 of the EEI material 120. Additionally, the determination subsystem 314 may be configured to determine the calibration data 370 based on the detected optical property 365. Similarly, the encoding subsystem 316 may be configured to encode the calibration data 370 to the media 350, e.g. by encoding the media 350 (e.g., indicia 130), such as a 2D barcode 132, such that when the indicia 130 is read or scanned, the scanner or reader interprets the current optical property 365 in relation to the deployment state 206 and the calibrated end state 208 of the EEI material 120 instead of the creation state 202 (or nominal creation state 202') and the end state 204 (or nominal end state 204). Specifically, the media 350 (e.g., indicia 130), such as the 2D barcode 132, may be encoded with appropriate information such that the reader or scanner determines that the optical property associated with the calibrated end state 208 is indicative of a product being expired or reaching its end of life. Data, such as the calibration data 370, may be encoded to the media 350 (e.g., indicia 130) according to any of the methods or techniques described in U.S. Pat. Nos. 10,318,781; 10,546,172; U.S. patent application Ser. No. 16/526,505 and U.S. patent application Ser. No. 16/526,527.

Alternatively, the processor (e.g., CPU 310) may analyze the captured image 360 to detect the current optical property 365 of the EEI material 120 at the deployment time, associate the current optical property 365 with the deployment state 206 of the EEI material 120, and determine the calibration data 370 based, at least in part, on the detected optical property 365. After determining the calibration data 370, the processor (e.g., CPU 310) may encode the calibration data 370 to the media 350 according to any of the methods or techniques described in U.S. Pat. Nos. 10,318,781; 10,546,172; U.S. patent application Ser. No. 16/526,505 and U.S. patent application Ser. No. 16/526,527. In another example, the processor (e.g., CPU 310) may cause another component of the media processing device 300 to perform the analyzing, determining and/or encoding.

Encoding the calibration data 370 as encoded calibration data 370' in the media 350 may include at least one of (i) printing or otherwise applying an indicia 130 (e.g., a barcode symbol 132) in the media 350, (ii) encoding an RFID tag 132 in the media 350, and (iii) including a reference to a database, where the reference may be encoded in the indicia 130 or RFID tag 132, and saving the calibration data in the database. Instead of printing the indicia 130, the indicia may be etched, imaged, or applied (e.g., as a sticker) to the media. It should be appreciated that other techniques for applying the indicia 130 in the media 350 or to the media 350 may be used.

In another example, the media processing device 300 may include an image sensor 322, which may be part of the image capture assembly 320. For example, the image capture assembly 320 may include an image sensor 322, such as a camera. The media processing device 300 may also include an imaging subsystem 380 (e.g., a print head, laser etcher, etc.). Both the image sensor 322 and the imaging subsystem 380 may be communicatively coupled to the processor (e.g., CPU 310), which may be configured to obtain creation data 372 associated with an environmental exposure indicator material 120 provided on a substrate (e.g., substrate 110). Additionally, the processor may be configured to obtain deployment data 374 of the environmental exposure indicator material 120. Obtaining the deployment data 374 may include causing the image sensor 322 to read a current optical property 365 of the EEI material 120 to determine the deployment state of the EEI material 120. Other examples of obtaining the deployment data 374 include estimating the deployment state or a respective optical property 365 at the deployment time and/or obtaining inputs to calculate or estimate the deployment state or a respective optical property 365 at the deployment time.

Furthermore, the processor may be configured to cause the imaging subsystem 380 to apply the indicia 130 on the substrate (e.g., substrate 110). As noted above, the indicia 130 or media 350 is associated with calibration data (e.g., encoded calibration data 370'), which is configured to be used to adjust indications of the cumulative environmental exposure provided by the EEI material 120 to compensate for a difference between the deployment state and the creation state. In one example, the imaging subsystem 380 may be a print head and causing the imaging subsystem 380 to apply the indicia 130 on the substrate (e.g., substrate 110) includes causing the print head to print the indicia 130 on the substrate. Alternatively, the imaging subsystem may be a laser etcher, and causing the imaging subsystem 380 to apply the indicia 130 to the substrate includes causing the laser etcher to etch the indicia 130 into the substrate.

Figure 4:
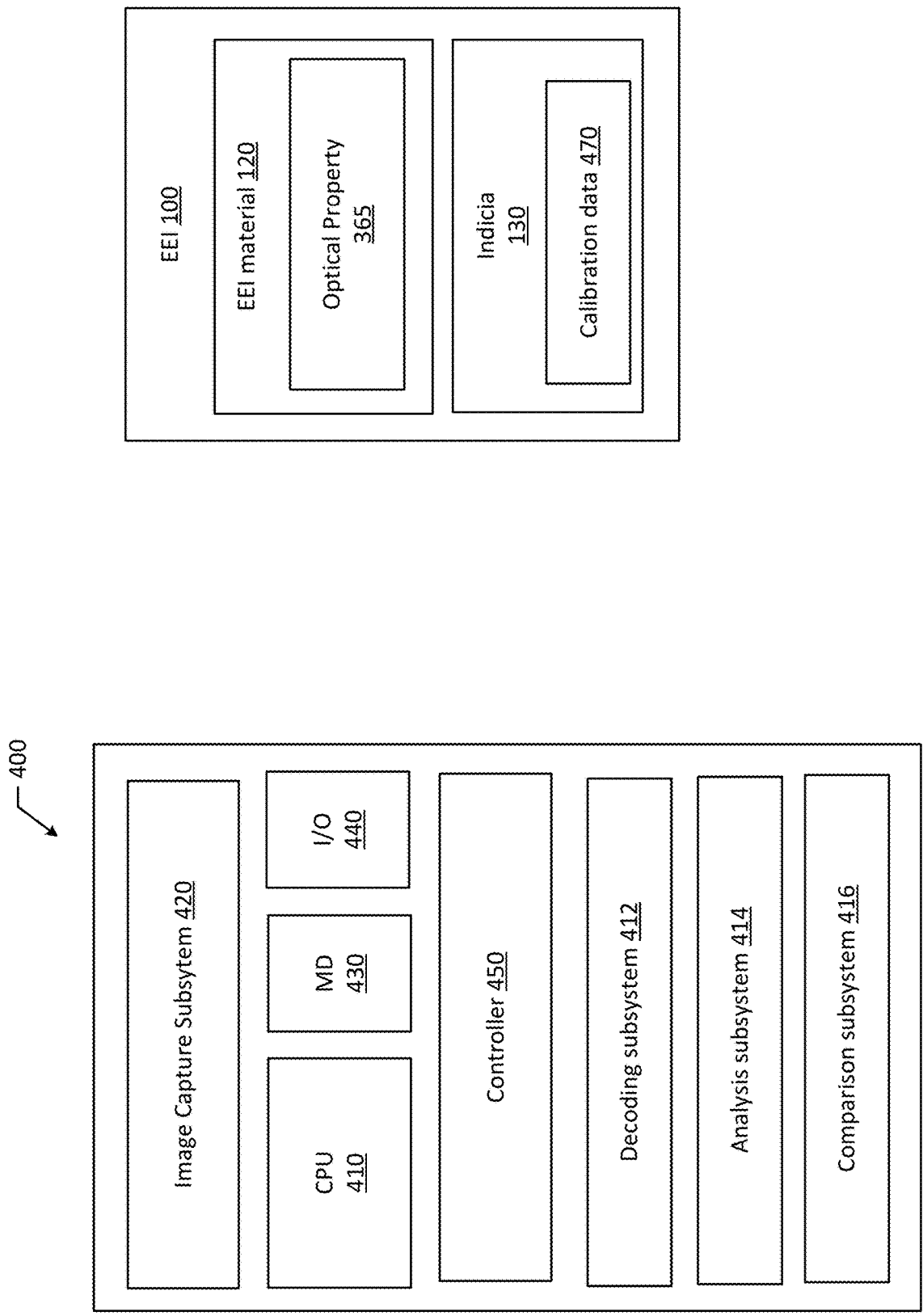
FIG. 4 is a block diagram of an example system for reading an environmental exposure indicator and a corresponding environmental exposure indicator according to an example of the present disclosure.

FIG. 4 illustrates a system 400 for reading an environmental exposure indicator (e.g., an EEI 100 including an indicia 130 and an environmental exposure indicator material 120 and any corresponding calibration data 470). For example, the system 400 may be used anywhere along the supply chain or in the field to determine a respective optical property 365 of the EEI material 120 of an EEI 100 and correlate that respective optical property 365 to a product characteristic based on the calibration data 470. In the illustrated example, the system 400 includes an image capture subsystem 420 and a controller 450. In an example, the system 400 may also include a processor (e.g., CPU 410), a memory (e.g., a memory device 430) and an input/output ("I/O") device 440. Furthermore, the system 400 may include a decoding subsystem 412, an analysis subsystem 414, and a comparison subsystem 416. One or more of the decoding subsystem 412, analysis subsystem 414, and comparison subsystem 416 may be specialized subsystems that make up the CPU 410 or controller 450. Conversely, one or more of the decoding subsystem 412, analysis subsystem 414, and the comparison subsystem 416 may be their own processing subsystems that reside on separate CPUs, GPUs or other processing equipment.

The image capture subsystem 420 may be configured to capture an image (e.g., image 360) of the environmental exposure indicator 100. The image capture subsystem may be a digital camera, image sensor or other imager provided by Zebra, such as a hands-free imager (e.g., Zebra's DS9208 hands-free imager). Additionally, the controller 450 may be configured to decode calibration data 470 from the indicia 100, analyze the captured image (e.g., image 360) to detect a current optical property 365 of the environmental exposure indicator material 120, compare the detected property (e.g., optical property 365) with the calibration data 470, and output an indication of the comparison. Example output indications are described according to any of the illustrative examples described in U.S. patent application Ser. No. 16/526,505 (e.g., see example representations of a barcode reader display provided in FIG. 9 and FIG. 10). The calibration data 470 may be associated with a property or characteristic of the EEI material 120 at an earlier time.

Reader

Figure 5:
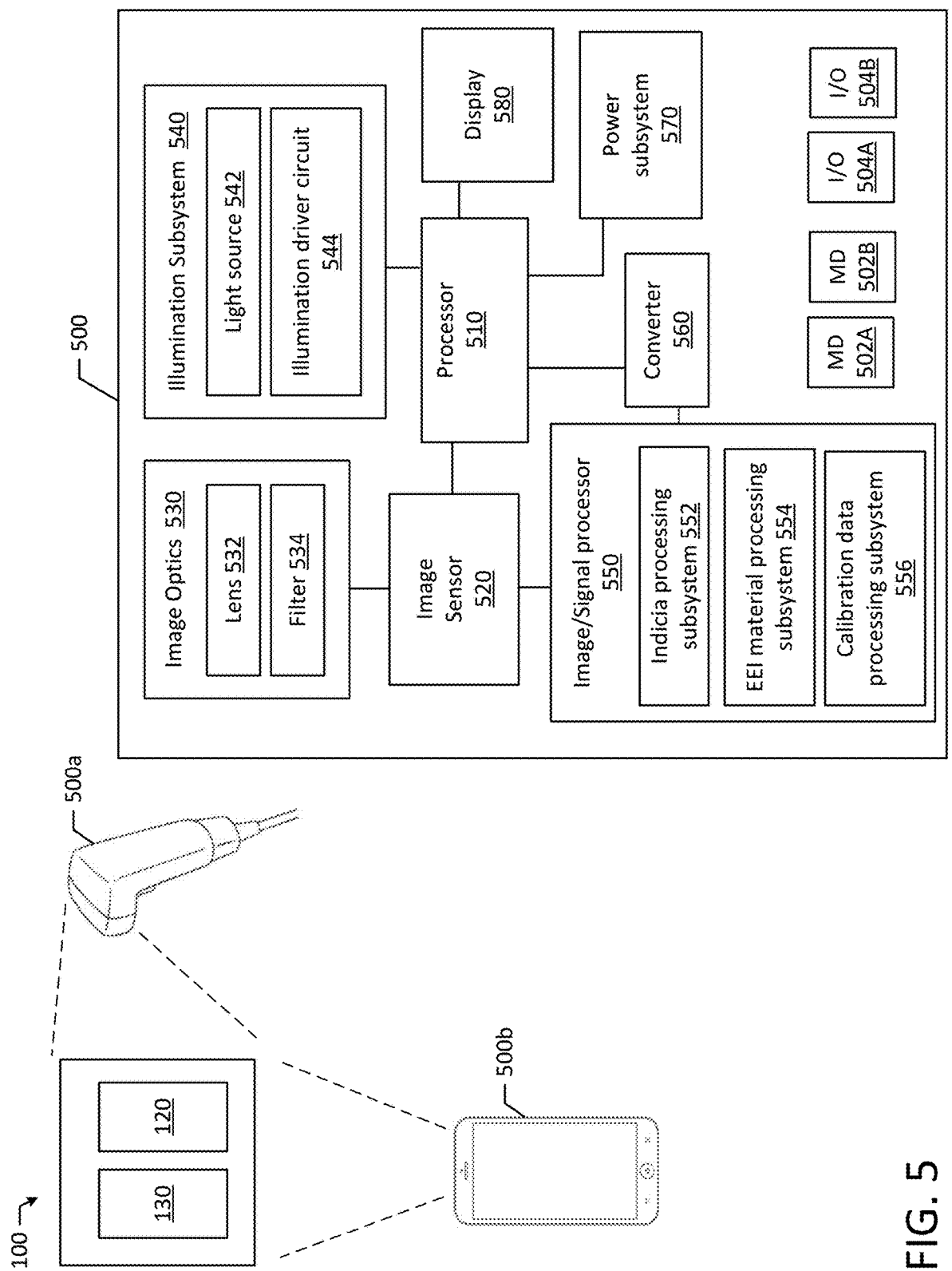
FIG. 5 is a block diagram of an example reader according to an example of the present disclosure.

FIG. 5 illustrate example devices 500a and 500b (referred to herein generally as reader 500) for reading EEI(s) 100, the associated indicia 130, and the associated EEI material 120. The reader 500 may also be configured to read calibration data associated with the EEI(s) 100. The reader 500 may be a dedicated reader (e.g., reader 500a) or an apparatus configured to read EEI(s) 100, indicia 130 and/or EEI material 120 (e.g., reader 500b) such as a mobile device, a personal digital assistant or PDA, a smartphone, a laptop, a tablet computer, or a desktop computer, as well as any other user devices. In a more specific example, reader 500 may be a Scanner provided by Zebra, such as any of the Zebra scanners or handheld computers (e.g., Zebra's EC50 and EC55 Enterprise Mobile Computers, MC2200 and MC2700, TC21 and TC26, etc.)

The reader 500 may be adapted to read EEI(s) with various indicia 130, such as machine-readable symbols (e.g., 1D and 2D barcodes). Additionally, the reader 500 may also transmit, receive, or exchange data with other network devices via a communication network. A network device may be a computer, a different reader 500, or any other device accessible via a communication network. Certain data may be stored in the reader 500, which may also be stored on a server within the network, either temporarily or permanently, for example in memory or a storage device (e.g., memory devices 502A-B). The network connection may be any type of network connection, such as a cellular or wireless connection, an Ethernet connection, digital subscriber line, telephone line, coaxial cable, etc. Access to a reader 500 or image data obtained by the reader 500 may be controlled by appropriate security software or security measures. An individual users' access may be defined by reader 500 and limited to certain data and/or actions.

The reader may include a processor 510, such as a microprocessor, that is communication with memory (e.g., memory devices 502A-B) and input/output devices 504A-B. The processor 510 may also communicate with an image sensor 520, image optics 530, an illumination subsystem 540, a power subsystem 570 and display 580. The image sensor 520 may receive light from image optics 530, which may include a lens 532 and a filter 534. The image sensor may pass the received light to an image or signal processor 550, which may send the signal to a converter 560 before sending the information to processor 510.

The processor 510 may be an integrated circuit microprocessor, such as a programmable logic or gate array. In an example, processor 510 may provide control inputs to control circuits (e.g., the illumination driver circuit 544) as well as other control circuits (not pictured). For example, the processor 510 may also provide control inputs for the image sensor 520 such as timing inputs.

The image sensor 520 may be a sensor array. The image sensor 520 may be configured to sense or detect light at a specific wavelength (e.g., visible wavelengths, non-visible wavelengths, etc.). In an example, the image sensor 520 may be a CMOS based image sensor array. In another example, the image sensor 520 may be a CCD based image sensor array. The image sensor may include a two-dimensional array of pixels that each includes a photosensitive sensitive region. The image sensor 520 may also be controlled by a sensor control subsystem (not pictured), which may send control signals to the image sensor 520.

The image optics 530 may include lens 532 and a filter 534. It should be appreciated that the image optics 530 may include multiple lenses 532 and/or filters 534. Additionally, the image optics 530 and illumination subsystem 540 may include a variety of optical technologies to achieve illuminating at least a portion of the EEI(s) 100 and receiving reflected light from the indicia 130 as well as any associated EEI material 120. As illustrated in FIG. 5, the illumination subsystem 540 may include a light source 542 and illumination driver circuit 544. The light source 542 may include an LED or bank of LEDs. In another example, the light source 542 may also include a laser diode to indicate a scanning region. The light source is configured to direct light or light energy toward a target object (e.g., an EEI 100). The reflected light or radiation from the target object (e.g., the EEI 100) may be focused by the image optics 530 (e.g., lens 532) onto the image sensor 520. In an example, the light source 542 is configured to provide light of sufficient intensity to allow the image sensor 520 to capture an image of at least a portion of the EEI 100 (e.g., the entire EEI 100, the indicia 130, the EEI material 120, etc.). In an example, the illumination driver circuit 544 may cause the light source 542 to emit light, which may pass through various apertures and lenses before reaching the target object (e.g., the EEI 100).

The image or signal processor 550 may be configured to process and decode information received and captured by the image sensor 520. For example, the image or signal processor 550 or processor 510 may perform image processing, analysis and/or decoding. The image or signal processor 550 may include an indicia processing subsystem 552, an EEI material processing subsystem 554, and a calibration data processing subsystem 556. The indicia processing subsystem 552 may be configured to perform image processing, analysis and/or decoding of the portion of the image related to the indicia 130, Similarly, the EEI material processing subsystem 554 may be configured to perform image processing, analysis and/or decoding of the portion of the image related to the EEI material 120 and the calibration data processing subsystem 556 may be configured to perform image processing, analysis and/or decoding of the portion of the image related to the calibration data.

Data from the image or signal processor 550 may be passed to a converter 560 before being sent to the processor 510. For example, the converter 560 may be an analog-to-digital converter. In another example, the signal (e.g., analog signal) may be amplified before being converted to a digital signal by converter 560.

The reader 500 may be used to obtain the product life data. The product life data may be obtained based on, at least a portion of one or more of the encoded data of the indicia 130, the EEI material 120, and the calibration data. For example, an image sensor 520 of a reader 500, such as a smartphone carrying a TTI App reader, may be used to scan the indicia 130 (e.g., 2D barcode), the associated EEI material 120, and possibly any associated calibration data. For example, the image may be captured from an image sensor 520, such as the smartphone camera, using a light source 542 (e.g., camera flash, such as a smartphone white flash). The nominally white flash intensity may overwhelm the ambient light and set the color temperature for image capture by the sRGB sensor of the camera. The image sensor 520 may capture the white incident light reflectance of the pixels, including those of the indicia 130 and EEI material 120.

In an example, a filter 534 (e.g., a physical color filter) may be positioned over the camera lens when the sRGB image is captured. Alternatively, a filter 534, such as a digital filter may be applied over the sRGB image pixel map to create a colored light filter effect on the reflectance data. As an example the digital filter may programmed to process the sRGB image based on an appropriate center wavelength and range, as in a bandpass filter. Then, the filtered color image RGB values may be reduced to a greyscale value (e.g., range 0 to 255) and a greyscale pixel map for the indicia 130 (e.g., Data Matrix barcode) may be created. In an example, the indicia 130 (e.g., 2D barcode) may include encoded data to provide the appropriate inputs and may be used to program or calibrate a barcode reader for reading an optical property (e.g., a reflectance value, a saturation value, a color value, a color density value, an optical density value or a color hue value) of the EEI material 120. For example, through encoded data (e.g., calibration data), data identifiers (DIs) and/or Application Identifiers (AIs), the indicia 130 can automatically program the reader 500 to properly sense an optical property (e.g., a reflectance value, a saturation value, a color value, a color density value, an optical density value or a color hue value) of the EEI material 120. The encoded data in the data identifiers (e.g., Application Identifiers) or the calibration data may also include the appropriate lifetime equation parameters such that the reader 500 can estimate the used and/or remaining product life at a specified temperature for the scanned product.

After scanning the EEI 100, and more specifically indicia 130, and obtaining the appropriate life data, the reader 500 may display information about the marked product and the remaining life on display 580. For example, a medical product may be scanned to reveal product lifetime data, such as a Monitor Category, 80 percent life remaining, expiration date (e.g., calculated from the estimated remaining life or based on some other criteria), and product authenticity. Additionally, indicia data may be revealed, which may include AI (01) for a GTIN, AI (10) batch number, and AI (21) serial number that are displayed by the reader 500. After reflectance data is obtained from the image sensor 520, the appropriate equation parameters can be used to determine equivalent exposure time ($t_e$) at the reference temperature, and subtracting ($t_e$) from the lifetime may provide the remaining product life at the reference temperature.

After reflectance data is obtained from the image sensor 520, the appropriate equation parameters can be used to determine equivalent exposure time ($t_e$) at the reference temperature. Subtracting ($t_e$) from the lifetime gives the remaining product life at the reference temperature. If the remaining life is positive, then the percentage of really remaining life may be calculated by dividing $t_e$ by L, and the barcode reader may display "Tests Passed", along with the vaccine's available remaining life. Referring back to FIGS. 2A-2D, the calibration data advantageously allows for more accuracy when determining characteristics of the product (e.g., remaining life) by adjusting the range or window, or more specifically the deployment state 206 and the calibrated end state 208 of the EEI material 120.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims. Also, it should be appreciated that the features of the dependent claims may be embodied in the systems, methods, and apparatus of each of the independent claims.

Calibration Data

Referring back to FIG. 3, the calibration data 370 may be based, at least partially on, at least one or more of the creation state 202 of the EEI material 120, the deployment state 206 of the EEI material 120, the end state 208 of the EEI material 120, and any other environmental history information associated with the EEI material 120 between the creation state 202 and the deployment state 206. In an example, the calibration data 370 may be used to determine the optical property range or window (e.g., calibrated window 215' from FIG. 2D). The calibration data 370 may include any of creation data 372, deployment data 374, analysis data 376 and any combination thereof.

Creation data 372 may include information related to the creation of the EEI material 120. For example, the creation data 372 may include any of (i) a timestamp related to a creation time or time of manufacture of the EEI material 120, (ii) the optical property of the EEI material 120 at the creation time or time of manufacture (e.g., the optical property of the creation state), (iii) the expected optical property at the end state 204 at the creation time or time of manufacture (e.g., the optical property of the end state), or any other information regarding the EEI material 120 at the time of creation. It should be appreciated that (ii) may be a measured value, an estimated value or a calculated value and may also include any inputs required to calculate the creation state 202 or an optical property associated with the creation state 202. Similarly, (iii) may be an estimated value, a calculated value, or a supplied value (e.g., a value from an EEI material spec sheet or look-up table).

Deployment data 374 may include information related to the deployment of the EEI material 120 in an EEI 100. For example, the deployment data 374 may include any of (i) a timestamp related to the deployment time of the EEI material 120, (ii) the optical property of the EEI material 120 at the deployment time (e.g., the optical property of the deployment state 206), (iii) the expected optical property at the end state 204' at the deployment time (e.g., the optical property of the calibrated end state 208), (iv) cumulative environmental exposure information from the creation time to the deployment time, (v) current environmental exposure information or data at the deployment time (e.g., exposure data such as history or time of exposure, age of the EEI material 120 since creation, exposure history), or any other information regarding the EEI material 120 at the deployment time. It should be appreciated that (ii) may be a measured value, an estimated value or a calculated value and may also include any inputs required to calculate the deployment state 206 or an optical property associated with the deployment state 206. Similarly, (iii) may be an estimated value, a calculated value, or a supplied value (e.g., a value from an EEI material spec sheet or look-up table).

Analysis data 376 may include information related to the analysis of the optical properties of the EEI material 120 in an EEI 100. For example, the analysis data 374 may include any of (i) data identifiers for an indicia associated with the EEI material 120 to create the EEI 100, (ii) product life equation parameters associated with the optical property of the EEI material 120, (iii) Arrhenius equation parameters of the EEI material 120, (iii) size information of the EEI material 120, (iv) location information of the EEI material 120, (v) equation(s) or estimation methodologies for determining the calibrated end state 208, which may be based on the creation state 202, deployment state 204, the creation data 372 and/or the deployment data 374.

Figure 9:
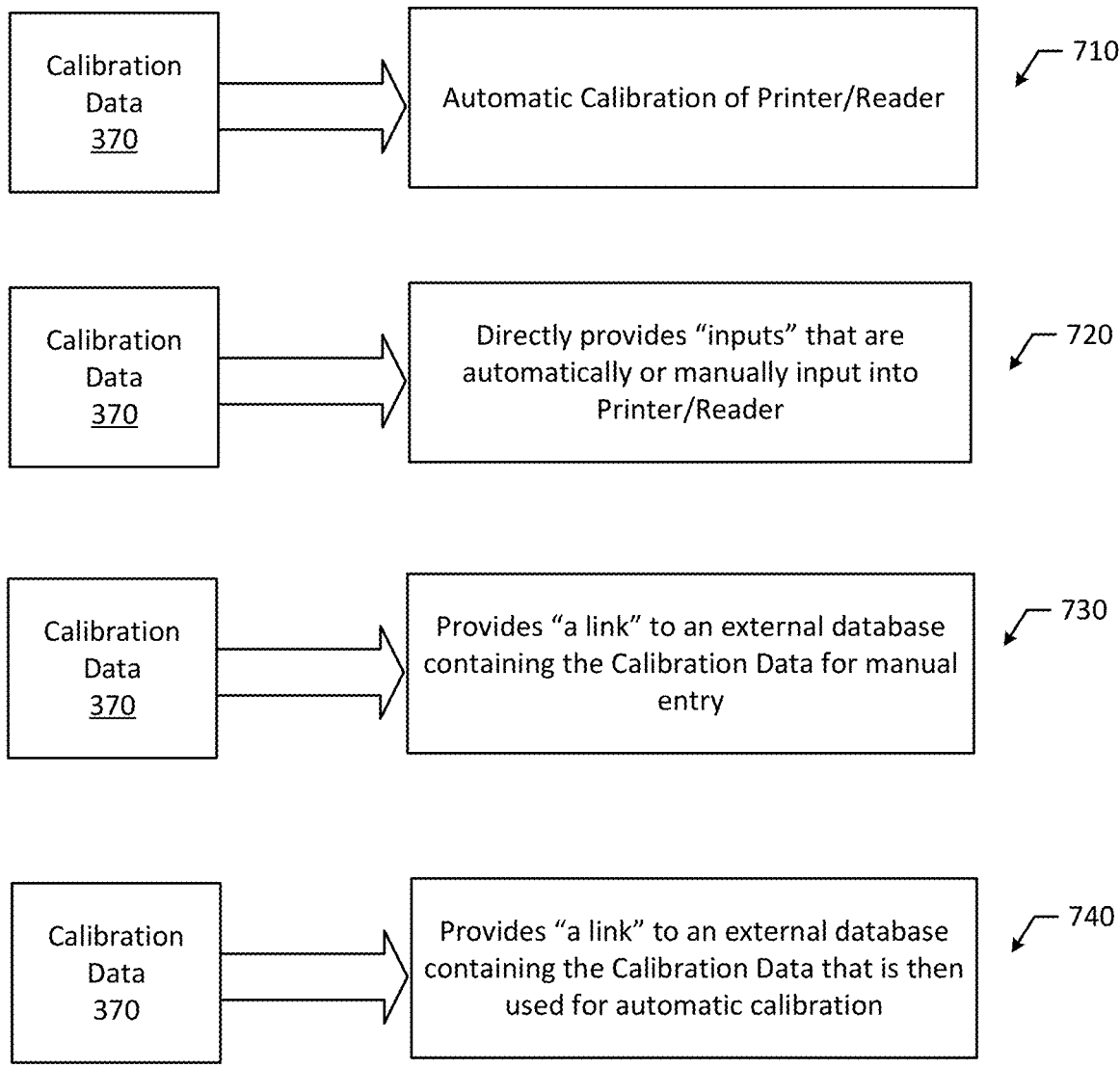
FIG. 9 is a representation of various examples of how calibration data is provided according to examples of the present disclosure.

Looking ahead to FIG. 9, the calibration data (e.g., calibration data 370, 470, which is illustrated as calibration data 370 in FIG. 9) may be provided and used for various calibration techniques. For example, in example 710, the calibration data 370 may be obtained and directly encoded into an indicia 130 provided by the media processing device 300, such as a printer. In one example, the calibration data 370 or a portion of the calibration data 370 may be provided on the print media fed to the printer, which may be manually input by a user when creating EEI(s) 100 with the printer. In another example, the printer may be associated with an image sensor or camera that is configured to determine an optical property of the EEI material 120 at the time of printing. The printer may determine calibration data 370 (e.g., deployment data 374) to encode into the indicia 130 based on the optical property 365 of the EEI material 120 immediately prior to printing. Once the indicia 130 is encoded with the calibration data 370 (e.g., analysis data 376), the encoded data may automatically calibrate a reader when scanning the indicia 130, such that the reader accurately reads to EEI material 120 (e.g., only accounts for environmental exposure from the deployment time until the time of scanning).

As indicated in example 720, the calibration data 370, which may include an input, such as the optical property of the EEI material 120 at the deployment time, may be determined and then manually programmed by a user into a printer control window before the indicia 130 is created. Similarly, the calibration data 370 may be encoded such that upon reading the EEI 100 with a reader, the reader outputs various values to be used as inputs in the reader when further scanning the EEI material 120.

As indicated in examples 730 and 740, the calibration data 370 may be provided in a database or some other remote data repository. Once the calibration data 370 is determined at the time of printing (e.g., the deployment time) the calibration data may be stored in the database. Then, the indicia 130 is encoded such that upon reading the indicia 130, the reader is redirected, via a link to the database or remote data repository, to retrieve the stored calibration data 370. In this manner, each indicia 130 can be encoded with a static link to the calibration data 370 while the database is dynamically updated with the calibration data. Similarly, when reading the indicia 130 and the EEI material 120 of the calibrated EEI 100, the reader may also redirect to the database such that the information stored on the database may be used to calibrate the reader. For example, the calibration data 370 may automatically calibrate the reader or provide inputs to a user to manually input into the reader for calibration, such that the reader accurately reads to EEI material 120 (e.g., only accounts for environmental exposure from the deployment time until the time of scanning).

Positioning and Placement of Eei Material

As described in the examples herein, the EEI material 120 is provided as part of an environmental exposure indicator. For example, the EEI material may be provided proximate to an indicia 130, such as a computer-readable symbol (e.g., a barcode symbol), such that the EEI material 120 is associated with the indicia 130. For example, if the indicia 130 is a barcode, the EEI material 120 may be positioned within the barcode or in an area outside of the barcode, but near the barcode. The proximity of the EEI material 120 to the indicia (e.g., barcode symbol) may be up to a few bars or modules from an outside edge of dark regions of the barcode symbol, which is described in more detail with reference to FIGS. 8A and 8B. In some examples, the EEI material 120 may partially or completely surround the indicia 130 (e.g., barcode). By providing the EEI material 120 in a region outside of the indicia 130 (e.g., barcode), more of the EEI material 120 (e.g., the entire environmentally sensitive portion of the indicator) may be read by a reader to determine the properties of the EEI material 120. Additionally, since each portion of the EEI material 120 (e.g., the entire environmentally sensitive portion of the indicator 100) may be read and utilized for analysis, less EEI material 120 may be needed for the same accuracy as other indicators including machine-readable symbols, such as barcode symbols with overprinted or underprinted EEI material 120 portions positioned within the barcode (e.g., in an invariant area), thereby further reducing waste and cost. In some embodiments, providing the EEI material 120 proximate to the indicia 130 (e.g., barcode symbol) may assist a user in presenting the EEI material to a reader or scanner because the both the barcode symbol and the EEI material may be in the field of view of the reader or scanner at the same time.

Figure 7A:
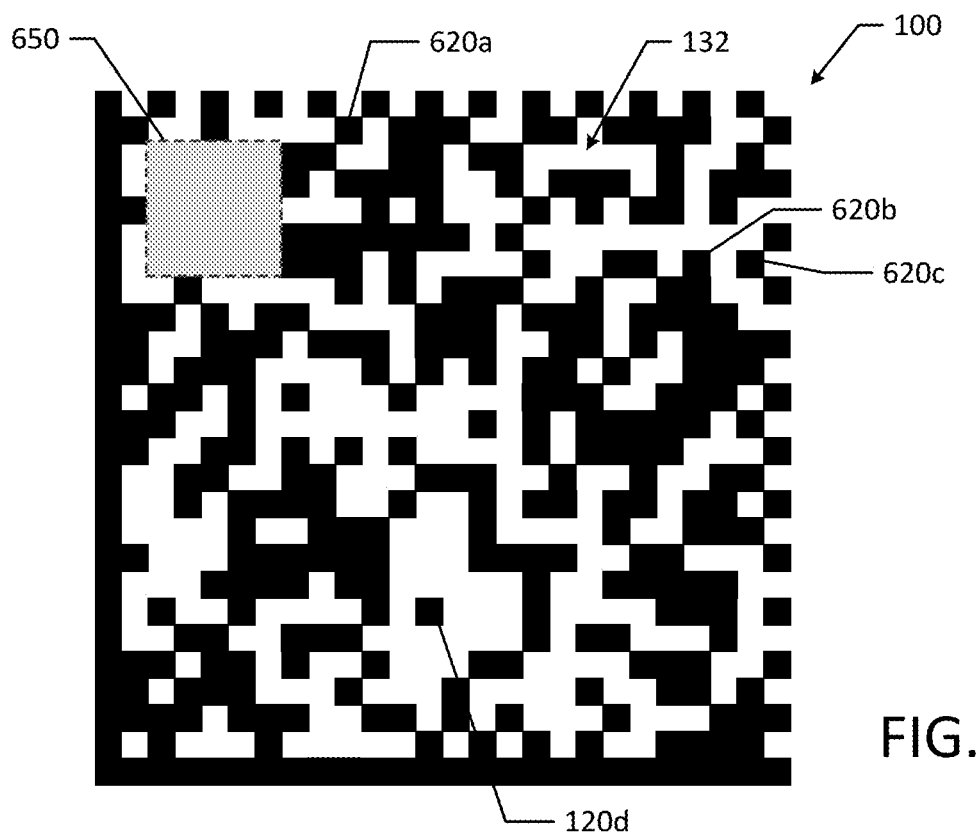
FIGS. 7A and 7B are representations of an environmental exposure indicator (e.g., a 26×26 Data Matrix) according to an example of the present disclosure.
Figure 7B:
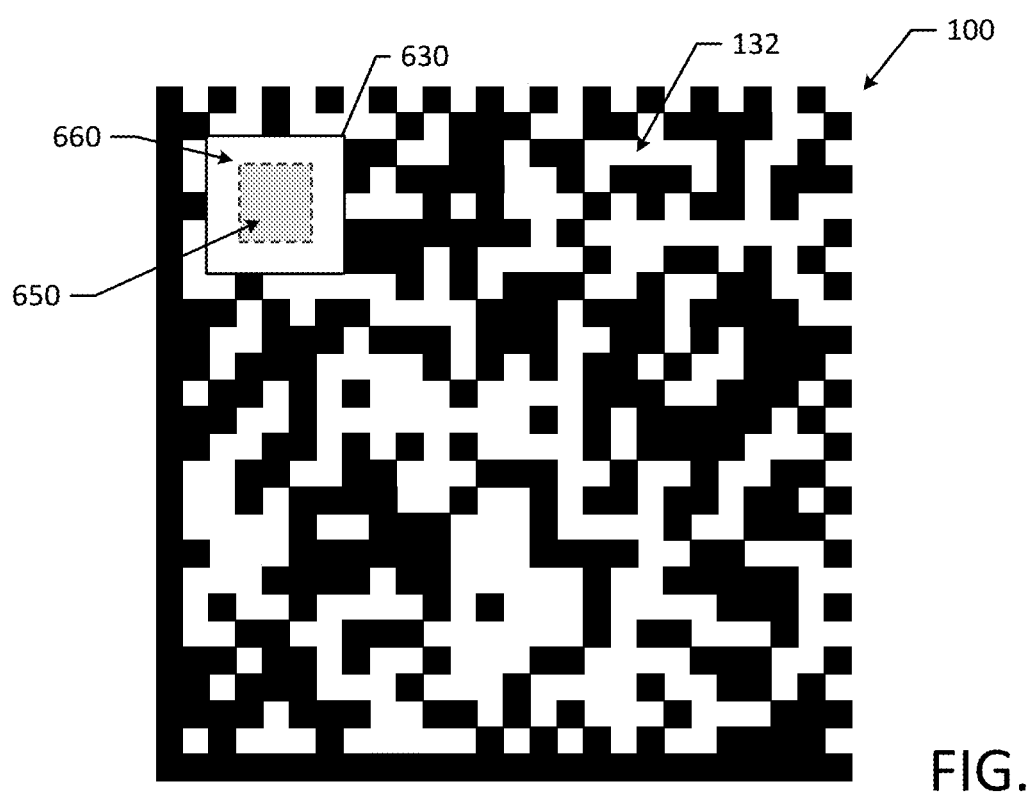

As discussed above, the EEI material 120 may be implemented as part of an environmental exposure indicator (EEI) 100. The EEI 100 may be a one-dimensional indicator (e.g., 1D barcode as illustrated in FIGS. 6A and 6B) or a two-dimensional indicator (e.g., 2D barcode as illustrated in FIGS. 7A and 7B). FIGS. 6A and 6B illustrate a representation of an EEI indicator 100, which includes an indicia 130, such as a one-dimensional barcode symbol 132 with an EEI material portion(s) 650a and 650b, hereinafter referred to as EEI material portion(s) 650. As illustrated in FIG. 6A, the EEI material portions 650 includes the EEI material 120 in a portion of the bars, modules or elements 620a and 620b of the barcode symbol 132. FIG. 6B illustrates another example where the EEI material portions 650a and 650b fill an entire bar, module or element 620. In another example, the entire barcode symbol 132 may be made of the EEI material 120. For example, all of the encoded data in the barcode may be provided by EEI material 120. Specifically, each of the bars, modules or elements may be printed in the EEI material 120. The barcode symbol 132 may include quiet zones, which are further described in U.S. patent application Ser. No. 17/007,795.

The EEI 100 or more specifically, the barcode symbol 132 may provide guidance and information regarding the reading or scanning of the EEI material portion(s) 650. In some implementations, the bar code symbol 132 itself may be used for calibration, for reference, or for location. For example, calibration data may be encoded within the barcode 132 and may be used as a reference when evaluation optical properties of the EEI material portion(s) 650. Alternatively, the EEI material portion(s) 650 may be in a known location, e.g., at a particular position with respect to the barcode, or with respect to location elements in the barcode, such as guard bars or a quiet zone (e.g., quiet zones) of a UPC-A barcode or the position detection patterns, alignment patterns, and/or quiet zone of a QR code. It should be appreciated that the quiet zones may include EEI material 120.

As discussed above, the EEI material 120 may be incorporated on a data carrying labels or tag, such as a barcode. It should be appreciated that the illustrative indicia 130 (e.g., barcode) examples disclosed herein may extend to other data carrying labels or tags. For example, the EEI material 120 may be applied to other text or graphics in a similar fashion. The systems and methods disclosed herein may apply to computer readable indicia, and more specifically the computer readable indicia that encode a data codeword(s). In an example, the computer readable indicia is a barcode symbol 132 or an RFID tag 134.

FIGS. 7A and 7B illustrate another representation of an EEI 100, which includes a two-dimensional error-correcting barcode symbol 132, which may be referred to herein generally as a 2D barcode 132, (e.g., a 26×26 Data Matrix) with an EEI material portion 650, according to an example embodiment of the present disclosure. The EEI 100 includes a barcode 132 or barcode region that includes a plurality of modules or elements 620a-n in a permanent or static color state (e.g., black elements). As illustrated in FIG. 7A, the barcode region 110 has a length and a width. The EEI 100 may also include an empty region(s) 630, which is void of elements or modules in a permanent or static color state (e.g., black elements) which advantageously further separates the EEI material portion 650 from the static portion to prevent degradation of any EEI material 120 within the EEI material portion 650. The empty region 630 has a length and a width. In an example, the EEI material portion 650 may entirely occupy the empty region 630 (as illustrated in FIG. 7A) or partially occupy the empty region 630 (as illustrated in FIG. 7B).

The empty region 630 is void of modules or elements 620 in the permanent or static color state. For example, the barcode 132 or barcode region may be provided with an empty space, such as a gap or cutout that forms the empty region 630. The empty region 630 is empty with respect to the static barcode symbol 132, but includes an EEI material portion 650 that includes an EEI material 120. Since the EEI material 120 may be provided on print media before supplying the print media to a printer, the barcode 132 or barcode region may be printed onto the print media with the EEI material 120 and arranged in such a manner to ensure that the gap or area void of modules or elements 620 corresponds to the portion of the print media including the EEI material 120. In other examples, the barcode 132 or barcode region and the EEI material portion 650 may be printed at the same time such that during the printing process an empty region 630 is not created and then filled with an EEI material 120, but instead the barcode 132 and the EEI material portion 650 are printed together.

Figure 8A:
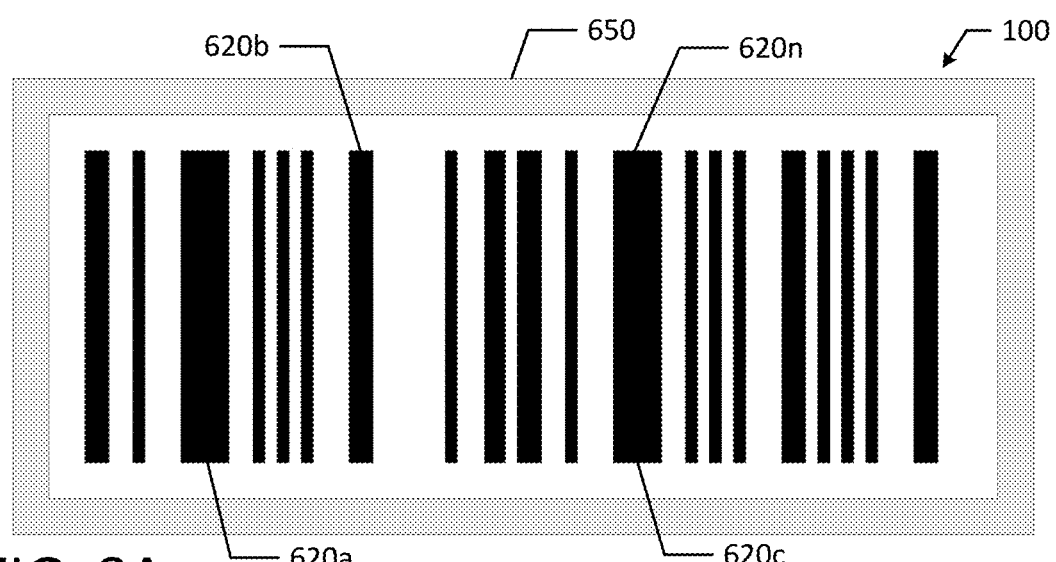
FIG. 8A is a representation of an environmental exposure indicator according to an example of the present disclosure.
Figure 8B:
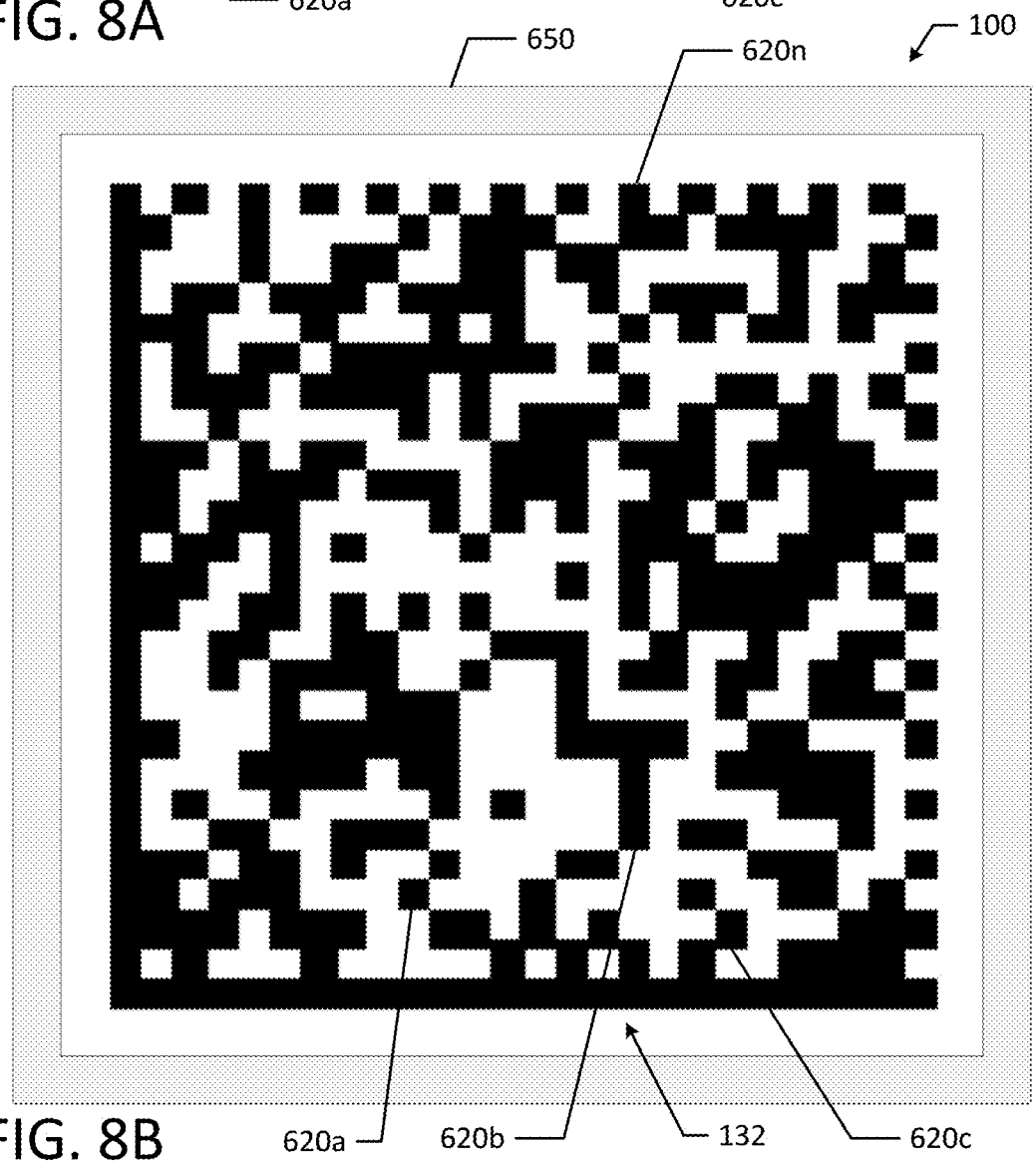
FIG. 8B is a representation of an environmental exposure indicator (e.g., a 26×26 Data Matrix) according to an example of the present disclosure.

In another example, the EEI material portion 650 of an EEI 100 may be positioned outside of the indicia 130 (e.g., barcode 132 or RFID tag 134). For example, the EEI(s) 100 illustrated in FIGS. 8A and 8B include a substrate with the indicia 130 (e.g., barcode 132) and EEI material 120 provided on the substrate near the indicia 130. As illustrated in FIGS. 8A and 8B, the EEI material 120 (applied to EEI material portion 650) is provided outside and spaced from the indicia 130 (e.g., barcode 132). By providing the EEI material 120 (applied to EEI material portion 650) outside and spaced from the indicia 130, the EEI material 120 is advantageously unaffected by the imaging process (e.g., printing process) of the indicia 130 (e.g., barcode 132).

FIG. 8A illustrates a representation of a one-dimensional EEI 100 and FIG. 8B illustrates a representation of a two-dimensional EEI 100. In an example, the EEI 100 may be a two-dimensional error-correcting indicator. The 2D EEI 100 may include an indicia 130, such as a barcode 132 (e.g., a 26×26 Data Matrix) and an EEI material portion 650.

It should be appreciated that a 26×26 Data Matrix is provided for illustration purposes only. A 26×26 Data Matrix contains 72 codewords, each formed of eight modules corresponding to the eight bits of the codeword, referred to as a "utah." The 24×24 bitmap matrix shows the layout of all the 72 codewords in a 26×26 Data Matrix. A "utah" is an arrangement of 8 modules to encode one codeword. It may be arranged either as a single connected group with a pattern frequently in the shape of the State of Utah in Data Matrix, or formed as two subgroups of connected modules split across two or more utah patterns. The systems and methods described herein may apply to other Data Matrix sizes and other styles of 1D and 2D barcodes. For example, the Data Matrix may be 10×10, 12×12, 14×14, 40×40, up to 144×144 and may have 8, 12, 18, 162 or 2178 codewords respectively. Additionally, it should be appreciated that the example embodiments disclosed herein may translate to various 2D barcodes including an Aztec Code, Code 1, CrontoSign, CyberCode, DataGlyphs, Data Matrix, Datastrip code, EZcode, High Capacity Color Barcode, InterCode, Maxi-Code, MMCC, NexCode, PDF417, QR code, ShotCode, SPARQCode, and the like.

As discussed above, the 1D and 2D barcodes 132 include a plurality of modules or elements 620a-n in a permanent or static color state (e.g., black elements). As illustrated in FIGS. 8A and 8B, the EEI material portion(s) 650 may occupy a hollow rectangular or square region surrounding the barcode 132. Additionally, the EEI material portion(s) 650 may be positioned in different spaces surrounding the barcode 132 as described in U.S. patent application Ser. No. 16/526,527 and U.S. patent application Ser. No. 17/007,795. The EEI material portion 650 may be a continuous region surrounding the barcode 110 (as illustrated in FIGS. 8A and 8B) or may partially occupy the space around the barcode 132 in different regions.

As illustrated in FIG. 7B, the EEI material portion 650 is provided with a gap or border 660 such that the EEI material portion 650 occupies less area than the empty region 630. The gap or border 660 may provide a buffer between the imaging process (e.g., printing process) of the barcode 132 or barcode region and printing of the indicia 130. In an example of FIG. 7B, the gap 660 is a single module-wide or single element-wide border (e.g., as wide as an element 620) around the EEI material portion 650.

In some examples, the EEI 100 may include multiple EEI material portions 650. Each EEI material portion may include a different EEI material 120. In another example, an EEI material portion 650 may include multiple EEI materials 120. For example, the EEI material portion 650 may include two different EEI materials 120 that are adjacent to each other in the EEI material portion 650. Each of the EEI materials 120 may change in response to or exposure to different environmental conditions. Specifically, the EEI material(s) 120 may include various components that are triggered or react at different exposure levels or to different exposure events.

Barcode Elements/Modules

The indicia 130 may be provided as a barcode 132. Specifically, a one-dimensional barcode symbol 132 may be employed (See FIGS. 6A, 6B and 8A) as part of EEI 100. Additionally, a two-dimensional error-correcting barcode symbol 132 may be provided as part of EEI 100. Barcode modules, bars or elements 620 may be used to encode barcode data. For example, each module or element (e.g., modules 620a-n) of the Data Matrix symbol may be used to encode one bit of data.

The barcode(s) 132 may be provided in a permanent or static color state, and the modules or elements 620 may optionally be square, rectangular, or circular. Each module or element in the barcode 132 is colored either nominally colored (e.g., black) or nominally empty or reflective (e.g., white). Nominally colored modules or elements may be black when printed on a light substrate or may be a lighter color when printed on a dark substrate. The nominally empty or reflective modules may not require any printing and may instead allow the substrate to show through. It will be appreciated that the example approaches disclosed herein may be extended to multi-color barcodes. The modules or elements 620 may form a module matrix, which is the visual manifestation of the binary bitmap matrix contained with the area of the symbol bounded by the Finder Pattern. The Finder Pattern may be an 1' formed by connected solid lines along two edges of the symbol module matrix, with a Clock Track formed by an alternating pattern of white and black modules or elements along the opposite edges of the symbol. It will be appreciated that in other bar code symbologies, other finder patterns may be employed.

Environmental Exposure Indicator Material

EEI material 120, such as environmentally sensitive materials may be provided as a compound, ink, toner, dye, paint or wax with environmentally sensitive pigments, which each may be generally referred to as an "EEI material". The corresponding EEI material portion(s) 650 of the EEI 100 may comprise the EEI material that has a chemistry that is predictably responsive to a specified environmental condition, undergoing a chemical or physical state change between a creation state and the end state. The chemical or physical state change may be a continuous state change, causing a continuous change in an optical property (e.g., a color state) of the EEI material 650 and corresponding EEI material 120 or a binary optical property state change once the measured environmental parameter crosses a predefined threshold.

In an example, the EEI material 120 may be sensitive to an environmental factor such as temperature, time, time and temperature, freezing, radiation, toxic chemicals, or a combination of such factors, or the like. In an example, the material may be a thermochromic material, such as a water-based irreversible thermochromic material designed to change permanently from white to black at 40° C. Additionally, the thermochromic material may be reversible. For example, the reversible thermochromic material may be a liquid crystal material or a leuco dye material (examples include QCR Solutions Reversible Thermochromic Inks and H.W. Sands Corporation inks). The material may also be a photochromic material (e.g., changes based on exposure to UV light). The material may be an ink, toner, dye, paint, wax or other coating(s) sensitive to time and temperature (an example includes the OnVu indicator).

The EEI material 120 may change from a darker color to a lighter color, a lighter color to a darker color, may change levels of transparency or opacity, and/or may change levels of reflectivity or absorptivity, or may change any other suitable characteristic. Additionally, the EEI material 120 may continuously change between a range of from a creation state (e.g., an initial color state) to the end state (e.g., an end color state). For example, a dynamic material may change from a lighter color to a dark blue, which may be alternatively transformed by a reader to values on continuous "greyscale". The greyscale (which is not necessary truly grey but is a continuous tone of some hue) is determined by reducing the R, G and B values of each pixel to a single greyscale value by a formula of form:

$$\text{Greyscale value} = (aR + bG + cB)/K$$

Where {a, b, c} represent the relative contribution of each sRGB color in the pixel, and K is scaling factor. Additionally, a dynamic material or dynamic indicator may continuously change from a white or clear color to a dark red or blue (e.g., changing from white, to a faint red, become less and less opaque until it reaches a solid red color at the end color state). Moreover, any suitable combination of colors may be used for the states of one or more dynamic materials.

Subsystems and Methods

In an example, a smartphone application may be designed to read and analyze a captured image with the EEI material 120 in one or more of states to determine a property of the captured image based on a current value of an optical property of the EEI material 120. The property may be adjusted based on calibration data associated with the EEI 100. In other examples, dedicated handheld readers may read and analyze the EEI material 120, such as a modified handheld reader provided by Zebra Technologies.

Figure 10:
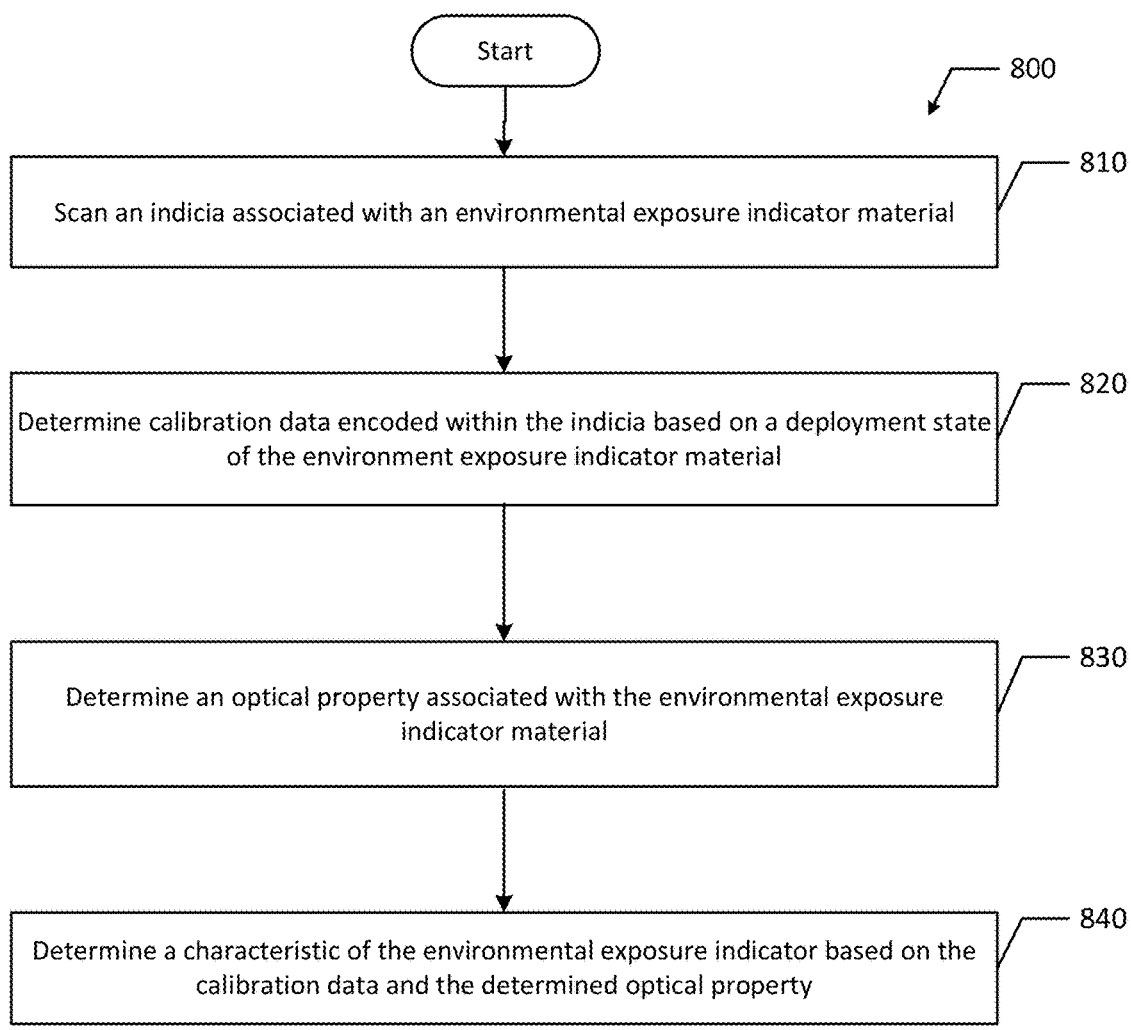
FIG. 10 is a flowchart illustrating an example process for reading an environmental exposure indicator according to an example of the present disclosure.

As described herein, the EEI material 120 may be present proximate to (e.g., within or near) an indicia 130 associated with the EEI 100. FIG. 10 illustrates a flowchart of an example method 800 for reading an environmental exposure indicator 100. Although the example method 800 is described with reference to the flowchart illustrated in FIG. 10, it will be appreciated that many other methods of performing the acts associated with the method 800 may be used. For example, the order of some of the blocks may be changed, certain blocks may be combined with other blocks, blocks may be repeated, and some of the blocks described are optional. The method 800 may be performed by processing logic that may comprise hardware (circuitry, dedicated logic, etc.), software, or a combination of both.

The example method 800 may include scanning (e.g., optically scanning) an indicia 130 associated with an EEI material 120 (block 810). The EEI material 120 may be configured, responsive to a cumulative exposure to an environmental condition, to undergo a continuous chemical or physical state change between a creation state 202 and an end state 204, causing a change in a respective optical property 365 of the environmental exposure indicator material 120. In an example, the EEI material 120 has a deployment state 206 with a respective optical property 365, such as a deployment optical property, in the deployment state 206. The deployment state is between the creation state 202 and the end state 204. In an example, the deployment state 206 is inclusive of the creation state 202, such that if the EEI 100 is deployed at the same time the EEI material 120 is created, then the creation state 202 and the deployment state 206 are the same state.

Method 800 may also include determining calibration data 370, 470 encoded within the indicia 130 based on a deployment state 206 of the EEI material 120 (block 820). The calibration data 370, 470 may be used to adjust indications of the EEI 100 provided by the EEI material 120 to compensate for a difference between the deployment state 206 and the creation state 204.

Additionally, method 800 may include determining an optical property 365 associated with the EEI material 120 (block 830). For example, at the time of scanning or reading, the method may include determining the optical property 365 associated with the EEI material 120. Determining the optical property 365 at the time of scanning or reading may include estimating the optical property 365, calculating the optical property 365, measuring the optical property 365, etc.

Furthermore, method 800 may include determining a characteristic of the EEI 100 based on the calibration data 370, 470 and the determined optical property 365 (block 840). For example, the characteristic may be remaining product life, expiration information, environmental exposure history information, etc. In an example, the characteristic is determined based, at least in part, on the calibration data 370, 470 and the determined optical property 365 at the time of scanning. For example, some of the calibration data 370, 470 may be encoded in the indicia 130 as encoded data identifiers, such as product life equation parameters (e.g., Arrhenius equation parameters) that are adjusted based on the deployment state to ensure that the reading disregards and post-deployment environmental exposure.

In an example, the EEI 100 may be scanned at any point in the supply chain (e.g., using a smartphone with carrying an environmental exposure reader App, or other special reader) to check the environmental exposure history for the labeled product. Additionally, the optical property may be determined by capturing an image(s) of the EEI 100. For example, the front facing camera of a smartphone may capture image(s) of the EEI 100 and the reader (e.g., smartphone) may process pixels in the image to assign or determine optical value(s) associated with the pixels. Optical values, especially for portions of the EEI material 120 may be an instantaneous value or an average value of one or more of the following properties: a reflectance value, a saturation value, a color value, a color density value, an optical density value or a color hue value.

Figure 11A:
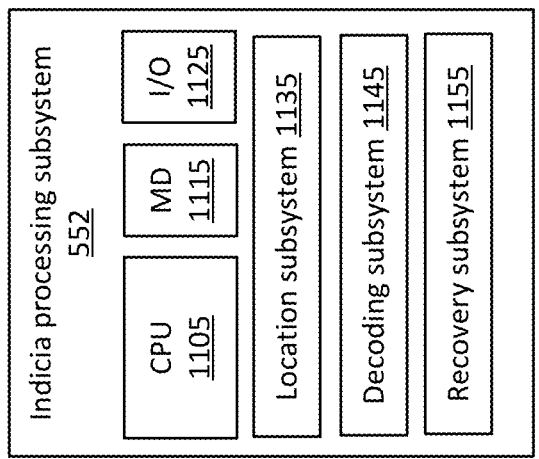
FIG. 11A is a block diagram of an example indicia processing subsystem according to an example embodiment of the present disclosure.

As illustrated in FIG. 11A, the indicia processing subsystem 552 may include a dedicated CPU 1105, memory device 1115 and input/output device 1125. Additionally, the indicia processing subsystem 552 may include a location subsystem 1135, a decoding subsystem 1145, and a recovery subsystem 1155. The location subsystem 1135 may locate or identify the indicia 130, such as a barcode symbol 132. The decoding subsystem 1145 may decode the identified indicia 130, such as the barcode symbol 132 and recover a symbol codeword sequence. Additionally, the recovery subsystem 1155 may recover underlying data codewords from the symbol codeword sequence.

Figure 11B:
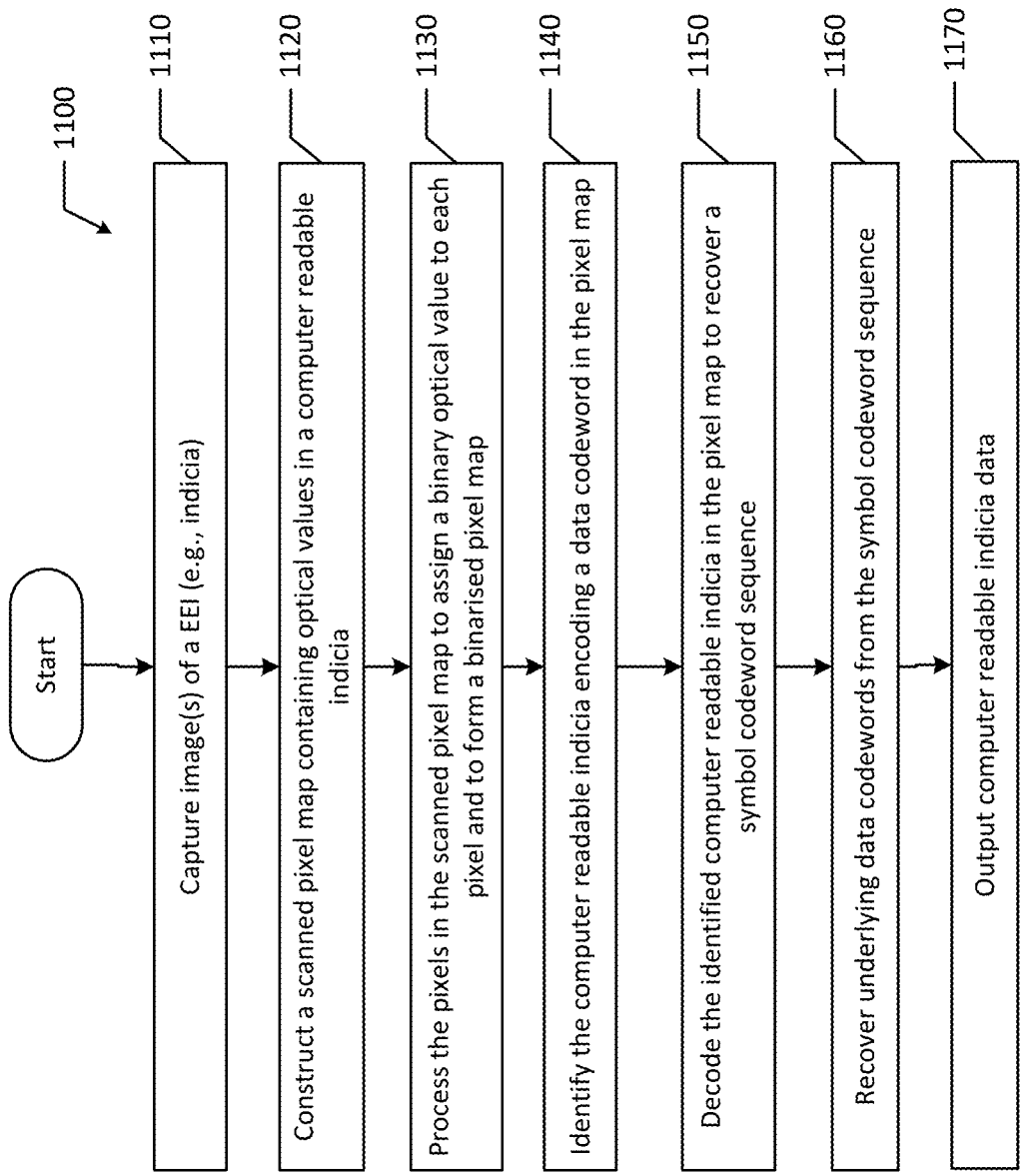
FIG. 11B is flowchart illustrating example processes performed by the indicia processing subsystem according to an example embodiment of the present disclosure.

FIG. 11B illustrates a flowchart of an example method 1100 that describes example processes performed by the indicia processing subsystem 552 of FIG. 11A according to an example embodiment of the present disclosure. Although the example processes are described with reference to the flowchart illustrated in FIG. 11B, it will be appreciated that many other methods of performing the acts associated with the method 1100 may be used. For example, the order of some of the blocks may be changed, certain blocks may be combined with other blocks, blocks may be repeated, and some of the blocks described are optional. The method 1100 may be performed by processing logic that may comprise hardware (circuitry, dedicated logic, etc.), software, or a combination of both.

The example processes illustrated in method 1100 include capturing image(s) of an EEI 100 (block 1110). The indicia processing subsystem 552 may also be configured to construct a scanned pixel map containing optical values in a computer readable indicia 130, such as a barcode symbol 132 (block 1120). The indicia processing subsystem 552 may also process the pixels in the scanned pixel map to assign a binary optical value to each pixel and may form a pixel map, such as a binarised pixel map (block 1130). The indicia processing subsystem 552 may identify the computer readable indicia 130 encoding a data codeword in the pixel map (block 1140). Additionally, the indicia processing subsystem 552 may decode the identified computer readable indicia 130, such as the barcode symbol 132, in the pixel map to recover a symbol codeword sequence (block 1150). The indicia processing subsystem 552 may also recover underlying data codewords from the symbol codeword sequence (block 1160). The indicia processing subsystem 552 may also output computer readable indicia data, such as barcode data (block 1170). The indicia data or barcode data may be associated with other data obtained from one or more of an EEI material 120 and calibration data associated with the EEI 100.

Figure 12A:
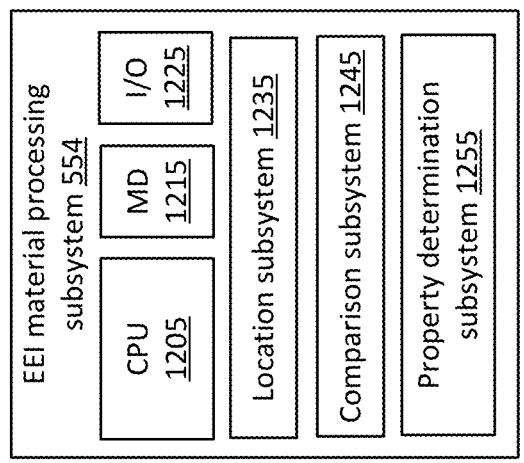
FIG. 12A is a block diagram of an example EEI material processing subsystem according to an example embodiment of the present disclosure.

As illustrated in FIG. 12A, the EEI material processing subsystem 554 may include a dedicated CPU 1205, memory device 1215 and input/output device 1225. Additionally, the EEI material processing subsystem 554 may include a location subsystem 1235, a comparison subsystem 1245, and a property determination subsystem 1255. The location subsystem 1235 may locate or identify EEI material 120 associated with an indicia 130 or an EEI 100. The comparison subsystem 1245 may compare a respective state of the EEI material 120 to other information regarding any one of the creation state 202, nominal creation state 202', end state 204, nominal end state 204' deployment state 206 and/or calibrated end state 208 of the EEI material 120. Additionally, the property determination subsystem 1255 may determine a property of the EEI material 120. For example, the property determination subsystem 1255 may determine a property of the EEI material 120 based on the comparison performed by the comparison subsystem 1245.

Figure 12B:
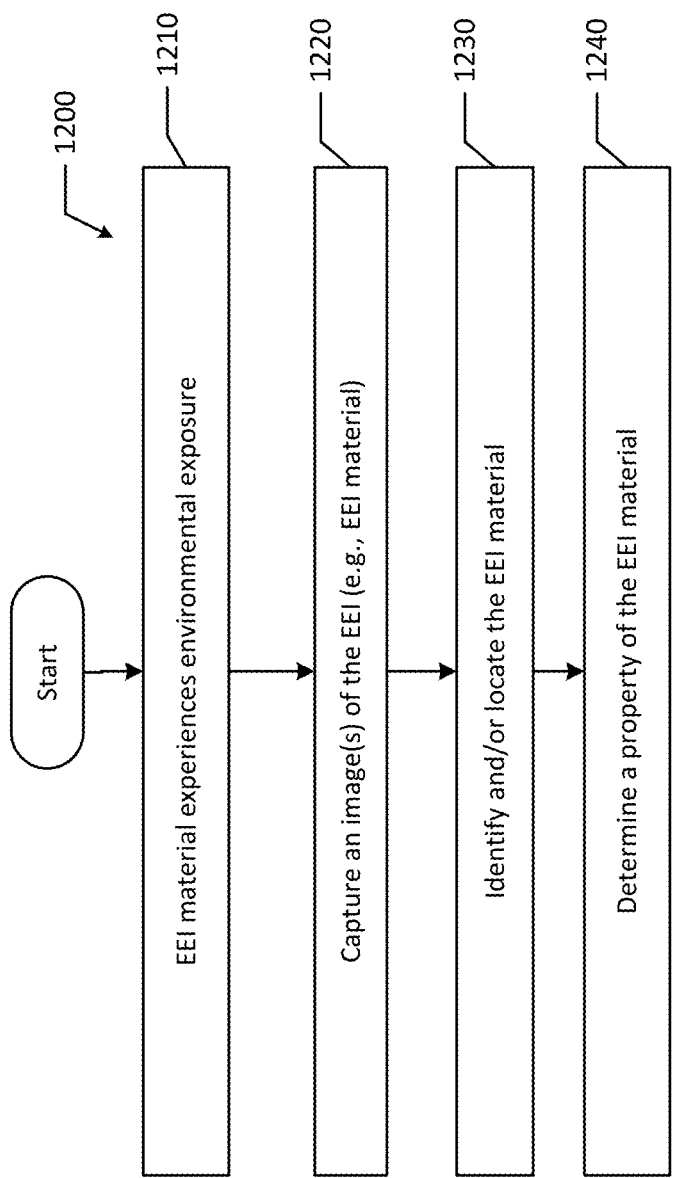
FIG. 12B is flowchart illustrating example processes performed by the EEI material subsystem according to an example embodiment of the present disclosure.

FIG. 12B illustrates a flowchart of an example method 1200 that describes example processes performed by the EEI material processing subsystem 554 of FIG. 12A according to an example embodiment of the present disclosure. Although the example processes are described with reference to the flowchart illustrated in FIG. 12B, it will be appreciated that many other methods of performing the acts associated with the method 1200 may be used. For example, the order of some of the blocks may be changed, certain blocks may be combined with other blocks, blocks may be repeated, and some of the blocks described are optional. The method 1200 may be performed by processing logic that may comprise hardware (circuitry, dedicated logic, etc.), software, or a combination of both.

The example processes illustrated in method 1200 include an EEI material 120 experiencing an environmental exposure (block 1210). Additionally, the EEI material processing subsystem 554 may be configured to capture image(s) of the EEI material 120 (block 1220). Alternatively, the EEI material processing subsystem 554 may gather information of the EEI material 120 without capturing image(s) of the EEI material 120 and instead may be a sensor that reads a property, e.g., an optical property, such as reflectance directly. The EEI material processing subsystem 554 may also be configured to identify and/or locate the EEI material 120 (block 1230). Additionally, the EEI material processing subsystem 554 may determine a property of the EEI material 120 (block 1240). For example, the EEI material 120 may have a chemistry that is predictably responsive to a specified environmental condition, such that the chemistry undergoes a chemical or physical state change between an initial state and an end state. The chemical or physical state change may be a continuous state change, causing a continuous change in the state of the EEI material 120 (e.g., a continuous change in an optical property, such as a color, reflectance, etc., of the EEI material 120). For example, the EEI material 120 may serve as an environmental indicator or sensor, such as a temperature monitor, measuring either cumulative heat exposure or passing beyond a set high or low temperature threshold value(s).

Figure 13B:
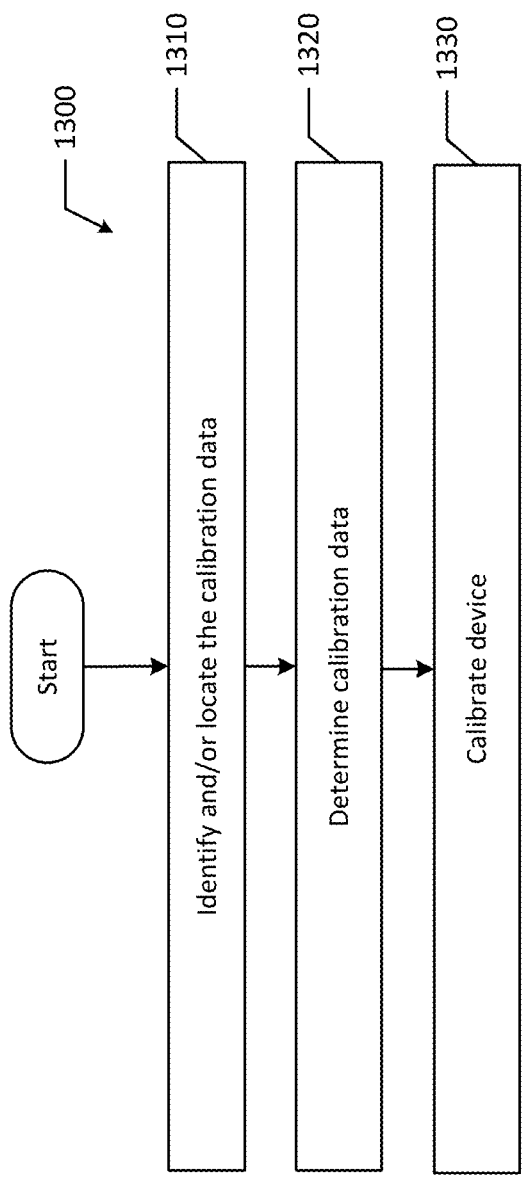
FIG. 13B is flowchart illustrating example processes performed by the calibration data processing subsystem according to an example embodiment of the present disclosure.
Figure 13A:
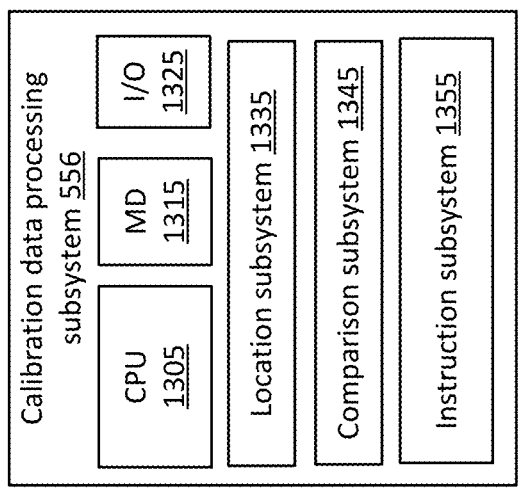
FIG. 13A is a block diagram of an example calibration data processing subsystem according to an example embodiment of the present disclosure.

As illustrated in FIG. 13A, the calibration data processing subsystem 556 may include a dedicated CPU 1305, memory device 1315 and input/output device 1325. Additionally, the calibration data processing subsystem 556 may include a location subsystem 1335, a comparison subsystem 1345 and an instruction subsystem 1355. The location subsystem 1335 may locate or identify the calibration data. The comparison subsystem may compare the calibration data against data obtained by the indicia processing subsystem 552 and the EEI material processing subsystem 554. Additionally, the instruction subsystem 1355 may send instructions to a device for calibration purposes (e.g., to calibrate a reader, scanner, printer, etc. based on the calibration data).

FIG. 13B illustrates a flowchart of an example method 1300 that describes example processes performed by the calibration data processing subsystem 556 of FIG. 13A according to an example embodiment of the present disclosure. Although the example processes are described with reference to the flowchart illustrated in FIG. 13B, it will be appreciated that many other methods of performing the acts associated with the method 1300 may be used. For example, the order of some of the blocks may be changed, certain blocks may be combined with other blocks, blocks may be repeated, and some of the blocks described are optional. The method 1300 may be performed by processing logic that may comprise hardware (circuitry, dedicated logic, etc.), software, or a combination of both.

The example processes illustrated in method 1300 include identifying and/or locating the calibration data (block 1310). The calibration data processing subsystem 556 may identify and/or locate the calibration data based on information obtained from the indicia processing subsystem 552, the EEI material processing subsystem 554 or a combination thereof. For example, the calibration data may be encoded within an indicia 130 and may be obtained by the indicia processing subsystem 552. The calibration data processing subsystem 556 may determine the values or information associated with the calibration data (block 1320). For example, calibration data processing subsystem 556 may read the calibration data from a database or obtain the calibration data based on the decoded information read from the indicia processing subsystem 552. Then, the calibration data processing subsystem 556 may calibrate a device (block 1330). Specifically, the calibration data processing subsystem 556 may determine what calibration data should be encoded in the indicia 130 and provide that information to an imager, such that the imager properly encodes or otherwise provides the calibration data in an EEI 100. Alternatively, the calibration data processing subsystem 556 may determine the calibration data information when reading an EEI and calibrate the reader, such that the reader associates a respective property of the EEI material 120 with an appropriate product characteristic.

Referring back to FIGS. 3 and 4, the analysis subsystems 312, 412 may perform similar processes and techniques as indicia processing subsystem 552 and EEI material processing subsystem 554. Similarly, determination subsystem 314 may perform similar processes and techniques as EEI material processing subsystem 554.

Encoding subsystem 316 may perform encoding processes and techniques according to any of the encoding described in U.S. Pat. Nos. 10,318,781; 10,546,172; U.S. patent application Ser. No. 16/526,505 and U.S. patent application Ser. No. 16/526,527. In an example, a Zebra printer or encoder may perform encoding, such as the ZT400 Series RFID printers/encoders, which includes a factory or field-installable UHF RFID encoder to support a broad range of applications. Similarly, decoding subsystem 412 may perform decoding processes and techniques according to any of the decoding described in U.S. Pat. Nos. 10,318,781; 10,546,172; U.S. patent application Ser. No. 16/526,505 and U.S. patent application Ser. No. 16/526,527. In an example, Zebra's PL5000 Series of hardware decoders may perform decoding and data capture for imagers and image capture subsystems. Specifically, the decoding subsystem 412 may provide decoding and data capture capabilities for 1D and 2D imagers.

Imaging subsystem 380 may perform imaging processes and techniques according to any of the imaging (e.g., printing, etching, etc.) described in U.S. Pat. Nos. 10,318,781; 10,546,172; U.S. patent application Ser. Nos. 16/526,505; 16/526,527; and 16/439,247. In an example, any of Zebra's desktop printers, industrial printers, mobile printers, card and badge printers, RFID printers and print engines may perform imaging.

Many modifications to and other embodiments of the invention set forth herein will come to mind to one skilled in the art to which these inventions pertain, once having the benefit of the teachings in the foregoing descriptions and associated drawings. Therefore, it is understood that the inventions are not limited to the specific embodiments disclosed, and that modifications and other embodiments are intended to be included within the scope of the appended claims. Although specific terms are employed herein, they are used in a generic and descriptive sense only and not for purpose of limitation.

The invention is claimed as follows:

1. An environmental exposure indicator comprising:
a substrate;
an environmental exposure indicator ("EEI") material provided on the substrate that is configured to change an optical property between a creation state and an end state;
the environmental exposure indicator material having a deployment state, between the creation state and the end state, at a deployment time; and
digital calibration data based on a measurement of the optical property of the EEI material determined at the deployment state and encoded in an indicium or memory coupled to the substrate,
wherein the digital calibration data is configured to be used to correctly interpret the current state of the EEI material at a time subsequent to the deployment time.

2. The environmental exposure indicator of claim 1, wherein the calibration data is encoded in an indicia provided on the substrate.

3. The environmental exposure indicator of claim 2, wherein the indicia is a barcode.

4. The environmental exposure indicator of claim 1, wherein the calibration data is encoded in an RFID tag coupled to the substrate.

5. The environmental exposure indicator of claim 1, wherein the optical property of the EEI material changes responsive to a cumulative exposure to a first environmental condition before the deployment time and the optical property of the EEI material changes responsive to a second cumulative exposure to a second environmental condition after the deployment time.

6. The environmental exposure indicator of claim 5, wherein the first environmental condition is temperature and the second environmental condition is temperature.

7. The environmental exposure indicator of claim 1, wherein the optical property is reflectivity of light in the visible spectrum.

8. The environmental exposure indicator of claim 1, wherein the indicator is configured for attachment to an item and the indicia further comprises data associated with the item.

9. A media processing device comprising:
a processor; and
an image capture assembly configured to:
capture an image of a media comprising an environmental exposure indicator ("EEI") material,
analyze the captured image to detect a current optical property of the environmental exposure indicator material,
determine calibration data based on the detected optical property, and
encode the determined calibration data to the media.

10. The device of claim 9, wherein encoding includes printing an indicia on the media.

11. The device of claim 9, wherein encoding includes encoding an RFID tag in the media.

12. The device of claim 9, wherein the calibration data is further based on a deployment state of the EEI material.

13. The device of claim 12, wherein the calibration data is further based on at least one of an end state and a nominal end state of the EEI material.

14. The device of claim 9, wherein an optical property of the EEI material is configured to change between the current optical property and an end state optical property in response to a cumulative exposure to an environmental condition.

15. The environmental exposure indicator of claim 1, wherein the calibration data is collected when the EEI is affixed to a product.

16. A system for reading an environmental exposure indicator comprising an indicia and an environmental exposure indicator ("EEI") material, the system comprising:
an image capture subsystem configured to:
capture an image of the environmental exposure indicator; and
a controller configured to:
decode digital calibration data from the indicia, the calibration data indicating a measurement of an optical property of the EEI material at an earlier time;
analyze the captured image to detect a current optical property of the EEI material,
compare the detected property with the digital calibration data, and
output an indication of environmental exposure based at least in part on the comparison.

17. The system of claim 16, wherein the calibration data includes at least one of (i) a timestamp indicative of a time of manufacture of the environmental exposure material and (ii) an initial optical property associated with the creation state of the environmental exposure material.

18. The system of claim 16, wherein the calibration data is at least one of (i) encoded within the environmental exposure indicator and (ii) linked to the environmental exposure indicator and obtained from an external database upon reading.

19. The system of claim 16, wherein the indicia is a two-dimensional barcode symbol that includes at least one encoded data identifier, and wherein a first data identifier of the at least one encoded data identifier indicates product life equation parameters associated with the optical property of the environmental exposure indicator material.

20. The system of claim 16, wherein the system is one of a barcode reader and a barcode scanner.

* * * * *